US012425762B2

(12) United States Patent
Tartz et al.

(10) Patent No.: US 12,425,762 B2
(45) **Date of Patent: *Sep. 23, 2025**

(54) AUDIO CONTROL FOR EXTENDED-REALITY SHARED SPACE

(71) Applicant: QUALCOMM Incorporated, San Diego, CA (US)

(72) Inventors: Robert Tartz, San Marcos, CA (US); Scott Beith, Carlsbad, CA (US); Mehrad Tavakoli, Cupertino, CA (US); Gerhard Reitmayr, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 43 days.

This patent is subject to a terminal disclaimer.

(21) Appl. No.: 17/835,561

(22) Filed: Jun. 8, 2022

(65) Prior Publication Data

US 2022/0303666 A1 Sep. 22, 2022

Related U.S. Application Data

(63) Continuation of application No. 16/924,714, filed on Jul. 9, 2020, now Pat. No. 11,399,229.

(51) Int. Cl.
*G10K 11/178* (2006.01)
*H04R 1/10* (2006.01)
(Continued)

(52) U.S. Cl.
CPC ......... *H04R 1/1083* (2013.01); *G10K 11/178* (2013.01); *H04R 3/005* (2013.01);
(Continued)

(58) Field of Classification Search
CPC .... H04R 1/1083; H04R 3/005; G10K 11/178; G10K 2210/103; G10K 2210/12;
(Continued)

(56) References Cited

U.S. PATENT DOCUMENTS 9,415,308 B1 * 8/2016 Zepp ................ G10K 11/17885
9,773,493 B1 9/2017 Lu et al.
(Continued)

FOREIGN PATENT DOCUMENTS

EP 2966643 A1 1/2016
WO 2016169604 A1 10/2016

OTHER PUBLICATIONS

International Search Report and Written Opinion—PCT/US2021/037693—ISA/EPO—Oct. 1, 2021.
Taiwan Search Report—TW110122087—TIPO—Jan. 21, 2025, 1 page.

*Primary Examiner* — Carolyn R Edwards
*Assistant Examiner* — Friedrich Fahnert
(74) *Attorney, Agent, or Firm* — QUALCOMM Incorporated

(57) ABSTRACT

Methods, systems, computer-readable media, and apparatuses for audio signal processing are presented. Some configurations include determining that first audio activity in at least one microphone signal is voice activity; determining whether the voice activity is voice activity of a participant in an application session active on a device; based at least on a result of the determining whether the voice activity is voice activity of a participant in the application session, generating an antinoise signal to cancel the first audio activity; and by a loudspeaker, producing an acoustic signal that is based on the antinoise signal. Applications relating to shared virtual spaces are described.

29 Claims, 19 Drawing Sheets

(51) Int. Cl.
*H04R 3/00* (2006.01)
*H04S 5/00* (2006.01)

(52) U.S. Cl.
CPC .......... *H04S 5/00* (2013.01); *G10K 2210/103* (2013.01); *G10K 2210/12* (2013.01)

(58) Field of Classification Search
CPC ..... G10K 2210/1081; G10K 2210/111; G10K 2210/3046; G10K 11/17837; G10K 11/17823; H04S 5/00
USPC .......................................................... 381/94.1
See application file for complete search history.

(56) References Cited

U.S. PATENT DOCUMENTS

| | | | | |
|---|---|---|---|---|
| 2010/0145701 | A1* | 6/2010 | Kaneko | G10L 13/033<br>381/119 |
| 2013/0287219 | A1 | 10/2013 | Hendrix et al. | |
| 2014/0093091 | A1* | 4/2014 | Dusan | H04R 1/1083<br>381/74 |
| 2014/0254820 | A1* | 9/2014 | Gardenfors | H04M 3/42221<br>381/80 |
| 2014/0286497 | A1 | 9/2014 | Thyssen et al. | |
| 2016/0080874 | A1 | 3/2016 | Fullam | |
| 2018/0063205 | A1* | 3/2018 | French | H04L 65/1073 |
| 2018/0090121 | A1 | 3/2018 | Hamalainen | |
| 2018/0322861 | A1* | 11/2018 | Ibrahim | H04R 29/008 |
| 2020/0135163 | A1* | 4/2020 | Lovitt | G10K 11/17837 |
| 2020/0294351 | A1* | 9/2020 | Feng | G10K 11/178 |
| 2022/0014839 | A1 | 1/2022 | Tartz et al. | |

* cited by examiner

AUDIO CONTROL FOR EXTENDED-REALITY SHARED SPACE

CROSS-REFERENCE TO RELATED APPLICATIONS

This application is a continuation of U.S. Non-Provisional application Ser. No. 16/924,714, filed Jul. 9, 2020, the disclosures of which is hereby incorporated by reference, in its entirety and for all purposes.

FIELD OF THE DISCLOSURE

Aspects of the disclosure relate to audio signal processing.

BACKGROUND

Computer-mediated reality systems are being developed to allow computing devices to augment or add to, remove or subtract from, substitute or replace, or generally modify existing reality as experienced by a user. Computer-mediated reality systems may include, as a couple of examples, virtual reality (VR) systems, augmented reality (AR) systems, and mixed reality (MR) systems. The perceived success of a computer-mediated reality system is generally related to the ability of such a system to provide a realistically immersive experience in terms of both video and audio such that the video and audio experiences align in a manner that is perceived as natural and expected by the user. Although the human visual system is more sensitive than the human auditory systems (e.g., in terms of perceived localization of various objects within the scene), ensuring an adequate auditory experience is an increasingly important factor in ensuring a realistically immersive experience, particularly as the video experience improves to permit better localization of video objects that enable the user to better identify sources of audio content.

In VR technologies, virtual information may be presented to a user using a head-mounted display such that the user may visually experience an artificial world on a screen in front of their eyes. In AR technologies, the real-world is augmented by visual objects that may be superimposed (e.g., overlaid) on physical objects in the real world. The augmentation may insert new visual objects and/or mask visual objects in the real-world environment. In MR technologies, the boundary between what is real or synthetic/virtual and visually experienced by a user is becoming difficult to discern.

Hardware for VR, AR, and/or MR may include one or more screens to present a visual scene to a user and one or more sound-emitting transducers (e.g., loudspeakers) to provide a corresponding audio environment. Such hardware may also include one or more microphones to capture an acoustic environment of the user and/or speech of the user, and/or may include one or more sensors to determine a position, orientation, and/or movement of the user.

BRIEF SUMMARY

A method of audio signal processing according to a general configuration includes determining that first audio activity in at least one microphone signal is voice activity; determine whether the voice activity is voice activity of a participant in an application session active on a device; based at least on a result of the determining whether the voice activity is voice activity of a participant in an application session, generating an antinoise signal to cancel the first audio activity; and, by a loudspeaker, producing an acoustic signal that is based on the antinoise signal. Computer-readable storage media comprising code which, when executed by at least one processor, causes the at least one processor to perform such a method are also disclosed.

An apparatus according to a general configuration includes a memory configured to store at least one microphone signal; and a processor coupled to the memory. The processor is configured to retrieve the at least one microphone signal and to execute computer-executable instructions to determine that first audio activity in the at least one microphone signal is voice activity; to determine whether the voice activity is voice activity of a participant in an application session active on a device; to generate, based at least on a result of the determining whether voice activity is voice activity of a participant in an application session, an antinoise signal to cancel the first audio activity; and to cause a loudspeaker to produce an acoustic signal that is based on the antinoise signal.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1A:
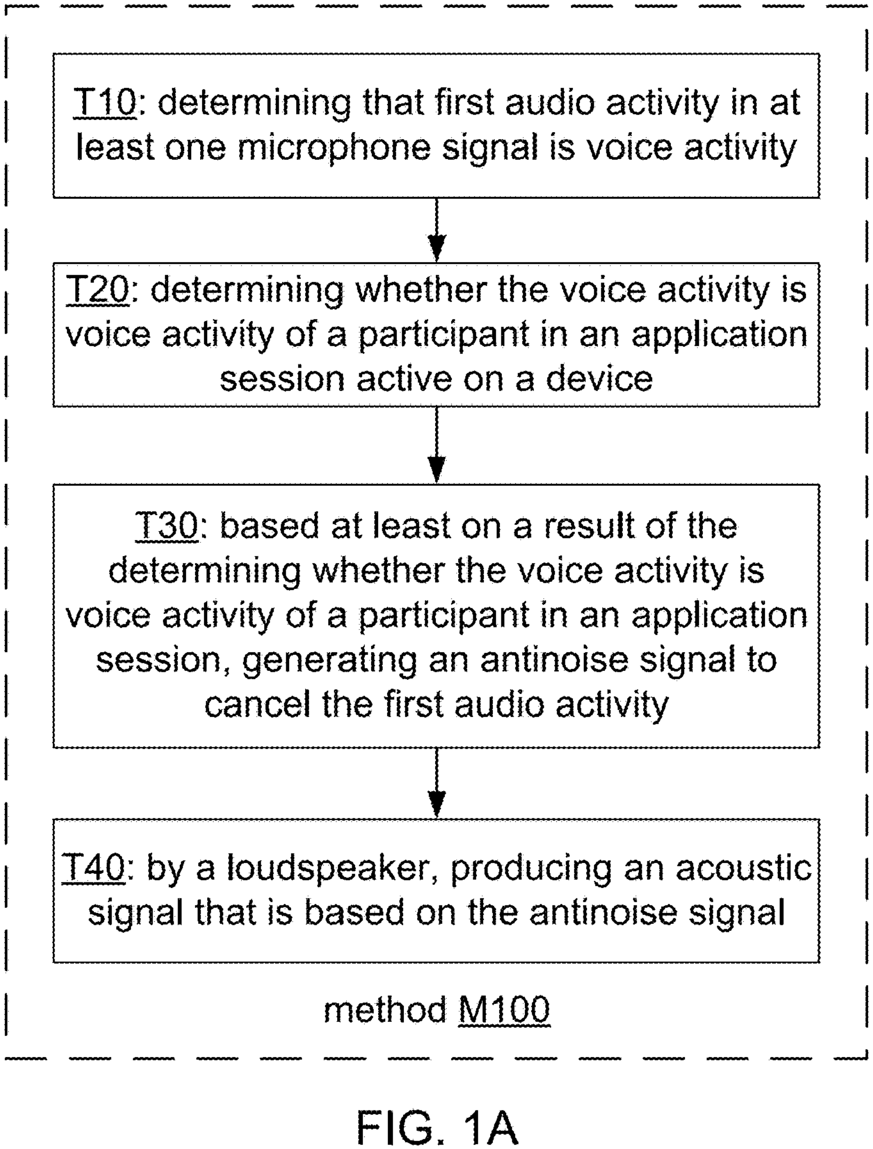
FIG. 1A shows a flow chart of a method M100 for voice processing according to a general configuration.

The term "extended reality" (or XR) is a general term that encompasses real-and-virtual combined environments and human-machine interactions generated by computer technology and wearables and includes such representative forms as augmented reality (AR), mixed reality (MR), and virtual reality (VR).

An XR experience may be shared among multiple participants by interaction among applications executing on devices of the participants (e.g., wearable devices, such as one or more of the examples described herein). Such an XR experience may include a shared space within which participants may communicate verbally (and possibly visually) with one another as if they are spatially close to one another, even though they may be far from each other in the real world. On each participant's device, an active session of an application receives audio content (and possibly visual content) of the shared space and presents it to the participant in accordance with the participant's perspective within the shared space (e.g., volume and/or direction of arrival of a sound, location of a visual element, etc.). Examples of XR experiences that may be shared in such fashion include gaming experiences and video telephony experiences (e.g., a virtual conference room or other meeting space).

A participant in an XR shared space may be located in a physical space that is shared with persons who are not participants in the XR shared space. Participants in an XR shared space (e.g., a shared virtual space) may wish to communicate verbally with one another without being distracted by voices of non-participants who may be nearby. For example, a participant may be in a coffee shop or shared office; in an airport or other enclosed public space; or on an airplane, bus, train, or other form of public transportation). When an attendee is engaged in an XR conference meeting, or a player is engaged in an XR game, the voice of a non-participant who is nearby may be distracting. It may be desired to reduce this distraction by screening out the voices of non-participants. One approach to such screening is to provide active noise cancellation (ANC) at each participant's ears to cancel ambient sound, including the non-participant voice(s). In order for the participants to be able to hear one another, microphones may be used to capture the participants' voices, and wireless transmission may be used to share the captured voices among the participants.

Indiscriminate cancellation of ambient sound may acoustically isolate a participant of an XR shared space from her actual surroundings, however, which may not be desired. Such an approach may also impede participants who are physically situated near one another from hearing each other's voice acoustically, rather than only electronically, which may not be desired. It may be desired to provide cancellation of non-participant voice without canceling all ambient sound and/or while permitting nearby participants to hear one another. It may be desired to provide for exceptions to such cancellation, such as, for example, when it is desired for a participant of an XR shared space to talk with a non-participant.

Several illustrative configurations will now be described with respect to the accompanying drawings, which form a part hereof. While particular configurations, in which one or more aspects of the disclosure may be implemented, are described below, other configurations may be used and various modifications may be made without departing from the scope of the disclosure or the spirit of the appended claims. Although the particular examples discussed herein relate primarily to gaming applications, it will be understood that the principles, methods, and apparatuses disclosed relate more generally to shared virtual spaces in which the participants may be physically local and/or remote to one another, such as conferees in a virtual conference room, members of a tour group sharing an augmented reality experience in a museum or on a city street, instructors and trainees of a virtual training group on a factory floor, etc., and that uses of these principles in such contexts is specifically contemplated and hereby disclosed.

FIG. 1A shows a flow chart of a method M100 for voice processing according to a general configuration that includes tasks T10, T20, T30, and T40. Task T10 determines that first audio activity (e.g., audio activity detected at a first time, or from a first direction) in at least one microphone signal is voice activity. Task T20 determines whether the voice activity is voice activity of a participant in an application session active on a device. Based at least on a result of the determining whether the voice activity is voice activity of a participant in an application session, task T30 generates an antinoise signal to cancel the first audio activity. Task T40 produces, by a loudspeaker, an acoustic signal that is based on the antinoise signal.

Figure 1B:
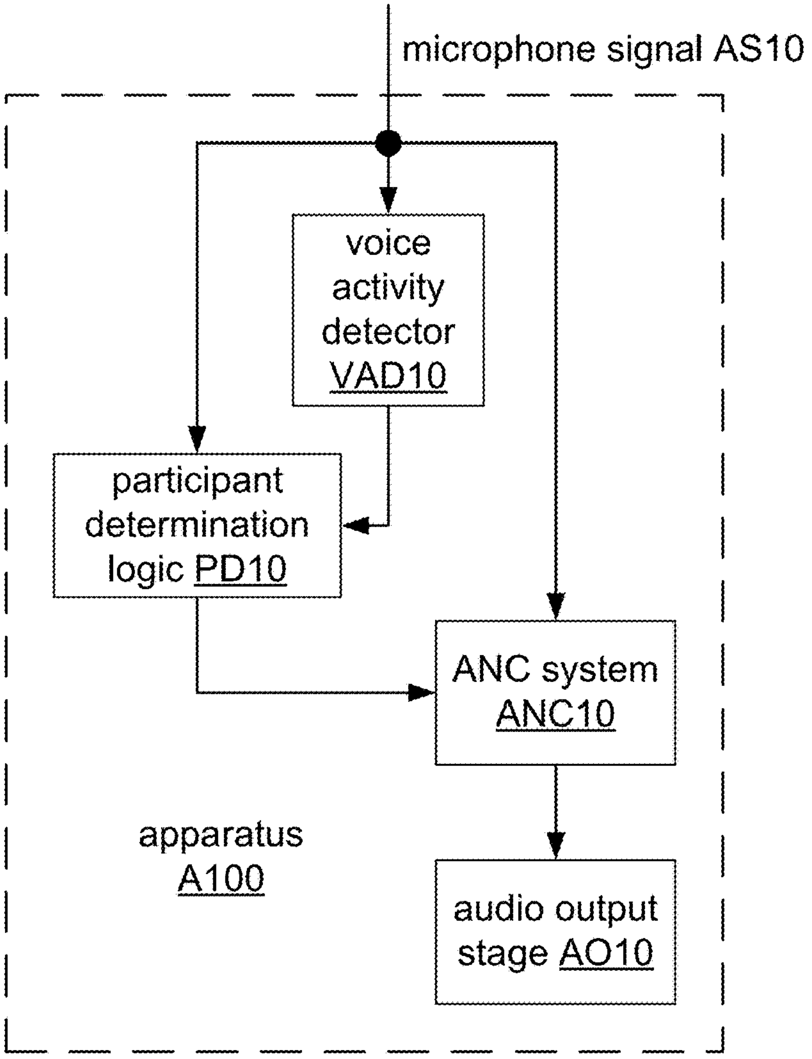
FIG. 1B shows a block diagram of an apparatus A100 for voice processing according to a general configuration.

FIG. 1B shows a block diagram of an apparatus A100 for voice processing according to a general configuration that includes a voice activity detector VAD10, an ANC system ANC10, and an audio output stage AO10. Apparatus A100 may be part of a device that is configured to execute an application for accessing an XR shared space (e.g., a device D10 as described herein). Voice activity detector VAD10 determines that audio activity in at least one microphone signal AS10 is voice activity (e.g., based on an envelope of signal AS10). Participant determination logic PD10 determines whether the detected voice activity is voice activity of a user of the device (e.g., based on volume level and/or directional sound processing). In one example, participant determination logic PD10 determines whether the detected voice activity is voice activity of a user of the device (also called "self-voice") by comparing energy of a signal from an external microphone (e.g., a microphone directed to sense an ambient environment) to energy of a signal from an internal microphone (e.g., a microphone directed at or within the user's ear canal) or bone conduction microphone. Based at least on this determination by participant determination logic PD10, ANC system ANC10 generates an antinoise signal to cancel the voice activity (e.g., by inverting the phase of microphone signal AS10). Audio output stage AO10 drives a loudspeaker to produce an acoustic signal that is based on the antinoise signal. Apparatus A100 may be implemented as part of a device to be worn on a user's head (e.g., at a user's ear or ears). Microphone signal AS10 may be provided by a microphone located near the user's ear to capture ambient sound, and the loudspeaker may be located at or within the user's ear canal.

Figure 2:
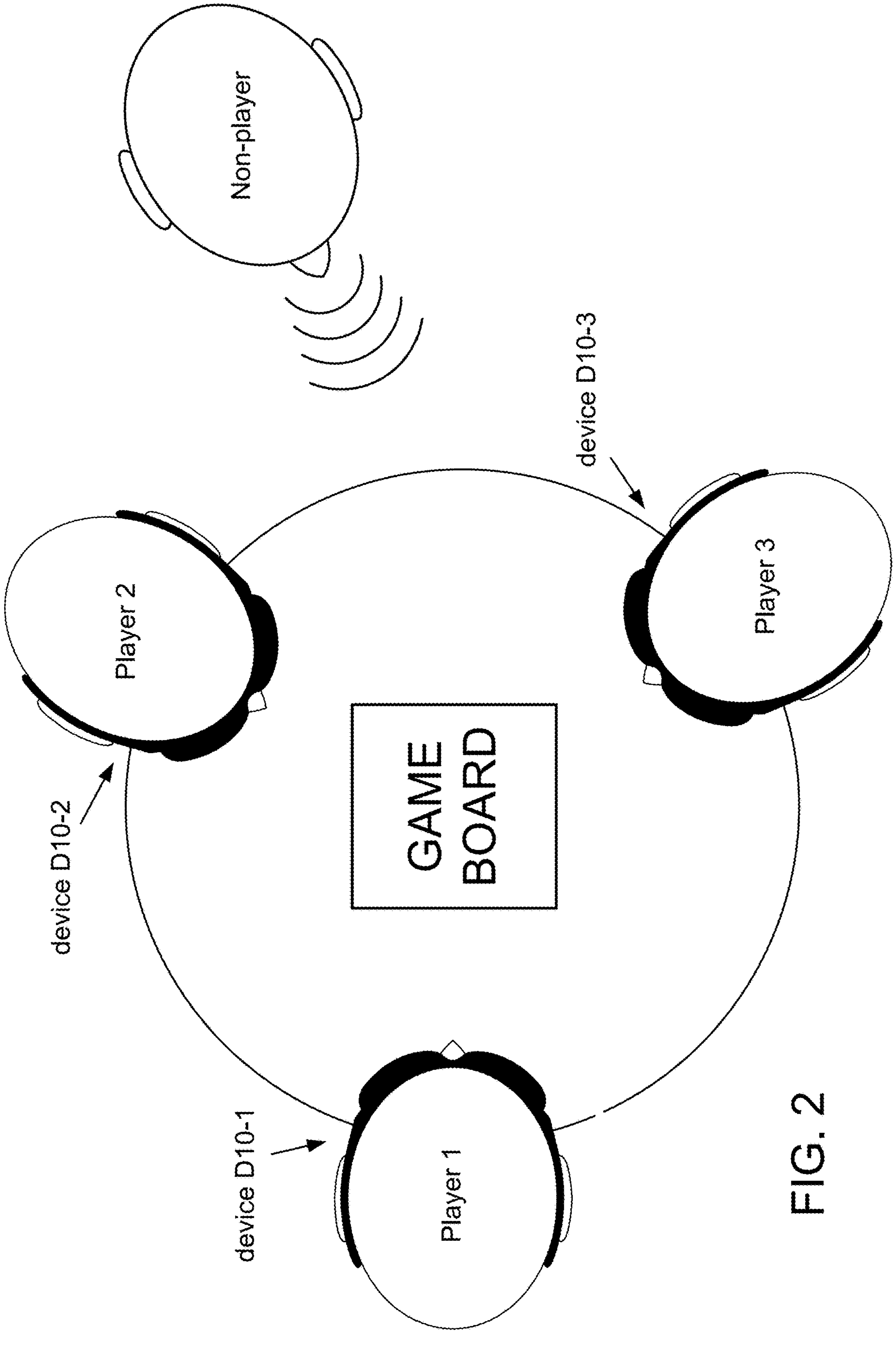
FIG. 2 shows an example of a number of players seated around a table playing an XR board game.

In a first example as shown in FIG. 2, a number of players are sitting around a table playing an XR board game. Each of the players (here, players 1, 2, and 3) wears a corresponding device D10-1, D10-2, or D10-3 that includes at least one external microphone and at least one loudspeaker directed at or located within the wearer's ear canal. As other persons who are not players pass by the table, some may stop to watch. The non-players do not perceive the entire XR game experience because, for example, they have no headset. As the non-players pass by, they may converse among one another. When a non-player speaks, each of the devices D10-1, D10-2, and D10-3 detects the voice activity and performs an active noise cancellation (ANC) operation to cancel the detected voice activity at the corresponding player's ear. When the non-player stops talking, the ANC operation also stops to permit the players to hear the ambient environment. It may be desired for the external microphone(s) of the devices to be located near the wearer's ears for better ANC performance.

Figure 3A:
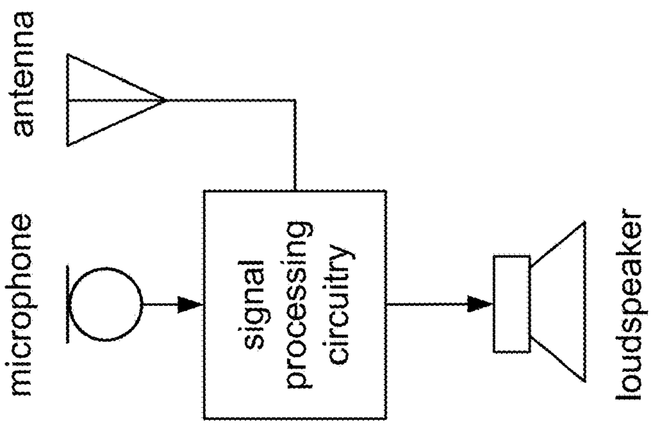
FIG. 3A shows a block diagram of an example of the hardware architecture of a hearable.

Each of the devices D10-1, D10-2, and D10-3 may be implemented as a hearable device or "hearable" (also known as "smart headphones," "smart earphones," or "smart earpieces"). Such devices, which are designed to be worn over the ear or in the ear, are becoming increasingly popular and have been used for multiple purposes, including wireless transmission and fitness tracking. As shown in FIG. 3A, the hardware architecture of a hearable typically includes a loudspeaker to reproduce sound to a user's ear; a microphone to sense the user's voice and/or ambient sound; and signal processing circuitry (including one or more processors) to process inputs and communicate with another device (e.g., a smartphone). An application session as described herein may be active on such processing circuitry and/or on the other device. A hearable may also include one or more sensors: for example, to track heart rate, to track physical activity (e.g., body motion), or to detect proximity. Such a device may be implemented, for example, to perform method M100.

Figure 3B:
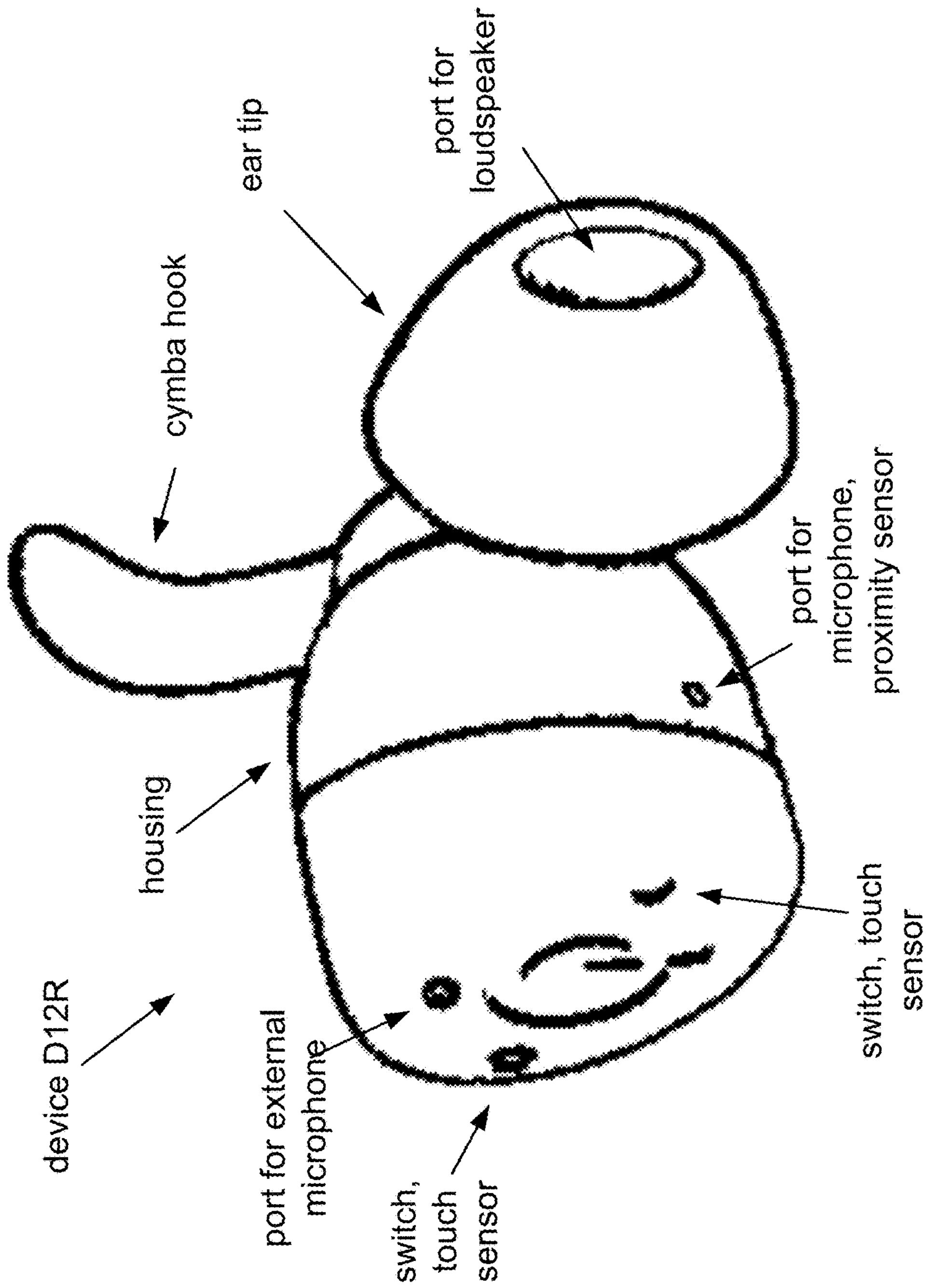
FIG. 3B shows a picture of an implementation D12R of device D10-1, D10-2, or D10-3 as a hearable.

FIG. 3B shows a picture of an implementation D12R of device D10-1, D10-2, or D10-3 as a hearable to be worn at a right ear of a user. Such a device D12R may include any among a hook or wing to secure the device in the cymba and/or pinna of the ear; an ear tip to provide passive acoustic isolation; one or more switches and/or touch sensors for user control; one or more additional microphones (e.g., to sense an acoustic error signal); and one or more proximity sensors (e.g., to detect that the device is being worn). Such a device may be implemented, for example, to include apparatus A100.

Figure 4:
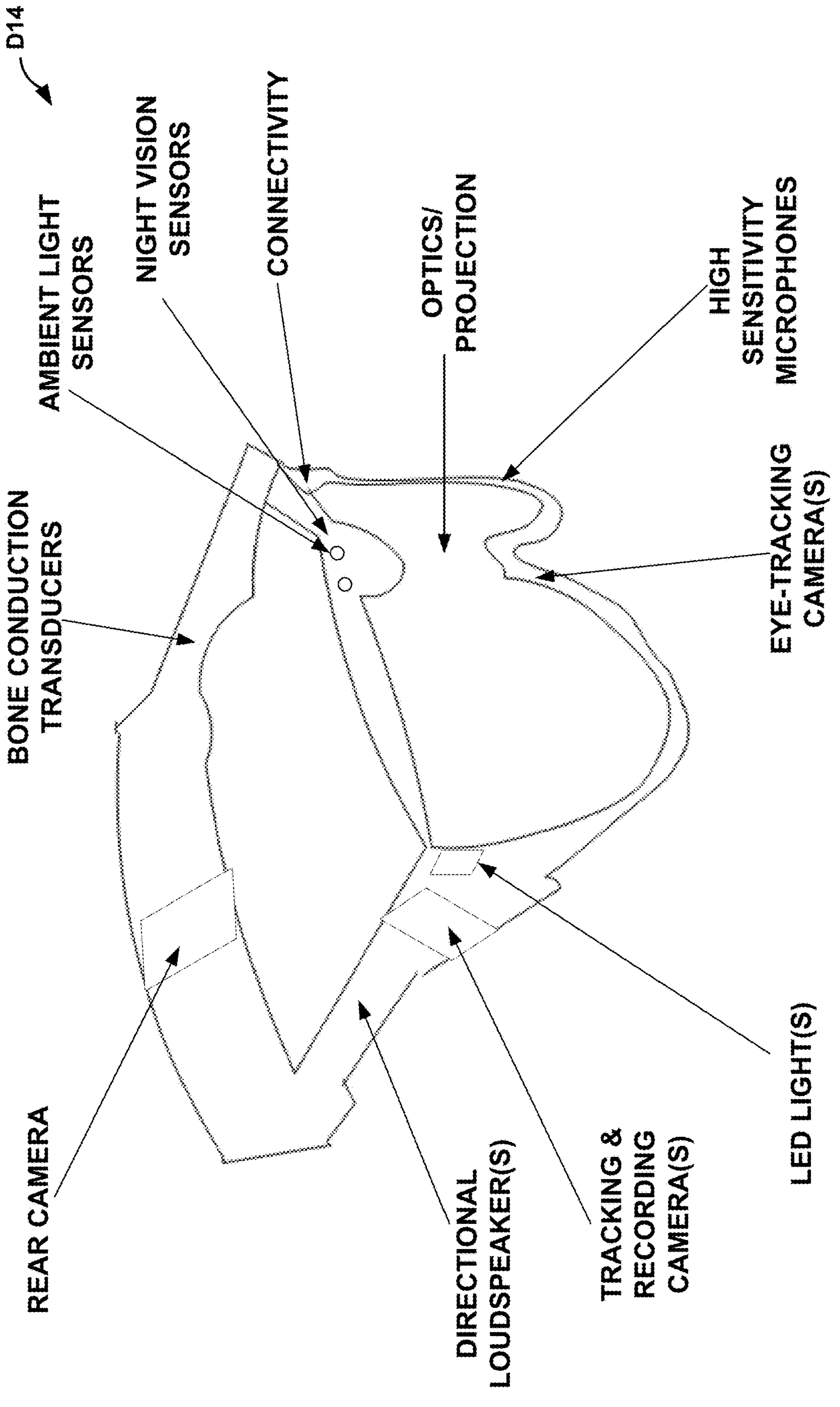
FIG. 4 shows an example of an implementation D14 of device D10-1, D10-2, or D10-3 as an XR headset.

FIG. 4 shows an example of an implementation D14 of device D10-1, D10-2, or D10-3 as an XR headset. In addition to high-sensitivity microphones, one or more directional loudspeakers, and one or more processors, such a device may also include one or more bone conduction transducers. Such a device may include one or more eye-tracking cameras (e.g., for gaze detection), one or more tracking and/or recording cameras, and/or one or more rear cameras. Such a device may include one or more LED lights, one or more "night vision" (e.g., infrared) sensors, and/or one or more ambient light sensors. Such a device may include connectivity (e.g., via a WiFi or cellular data network) and/or a system for optically projecting visual information to a user of the device. To support an immersive experience, such a headset may detect an orientation of the user's head in three degrees of freedom (3DOF)—rotation of the head around a top-to-bottom axis (yaw), inclination of the head in a front-to-back plane (pitch), and inclination of the head in a side-to-side plane (roll)—and adjust the provided audio environment accordingly. An application session as described herein may be active on a processor of the device. Other examples of head-mounted devices (HMDs) that include one or more external microphones, one or more loudspeakers, and one or more processors and may be used to implement device D10-1, D10-2, or D10-3 include, for example, smart glasses.

An HMD may include multiple microphones for better noise cancellation (e.g., to allow ambient sound to be detected from multiple locations). An array of multiple microphones may also include microphones from more than one device that is configured for wireless communication: for example, on an HMD and a smartphone; on an HMD (e.g., glasses) and a wearable (e.g., a watch, an earbud, a fitness tracker, smart clothing, smart jewelry, etc.); on earbuds worn at a participant's left and right ears, etc. Additionally or alternatively, signals from several microphones located on an HMD close to the user's ears may be used to estimate the acoustic signals that the user is likely hearing (e.g., the proportion of ambient sound to augmented sound, the qualities of each type of incoming sound), and then adjust specific frequencies or balance as appropriate to enhance hearability of augmented sound over the ambient sound (e.g., boost low frequencies of game sounds on the right to compensate for the masking effect of a detected ambient sound of a truck driving by on the right).

Figure 5:
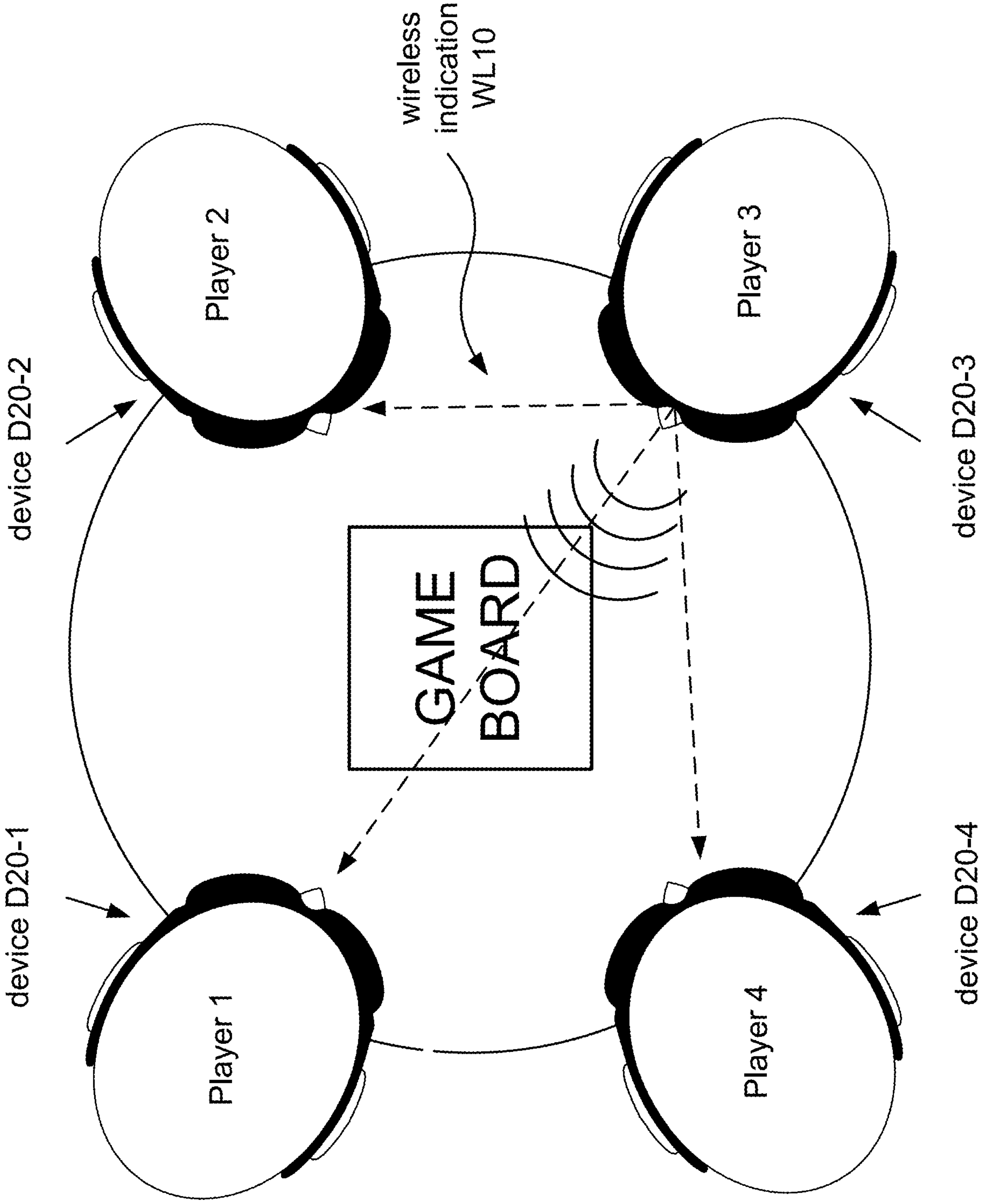
FIG. 5 shows an example of four players seated around a table playing an XR board game.

In a second example as shown in FIG. 5, four players are sitting around a table playing an XR board game. Each of the players (here, players 1, 2, 3, and 4) wears a corresponding device D20-1, D20-2, D20-3, or D20-4 (e.g., a hearable, headset, or other HMD as described herein) that includes at least one microphone, at least one loudspeaker, and a wireless transceiver. When one of the players speaks (here, player 3), the players' devices detect the voice activity. The player's device also detects that she is speaking (e.g., based on volume level and/or directional sound processing) and uses its wireless transceiver to signal this detection to the other players' devices (e.g., via sound, light, or radio). This signal is depicted as wireless indication WL10. Because the voice belongs to one of the players, no ANC is activated by the devices in response to the detected voice activity.

Figure 6A:
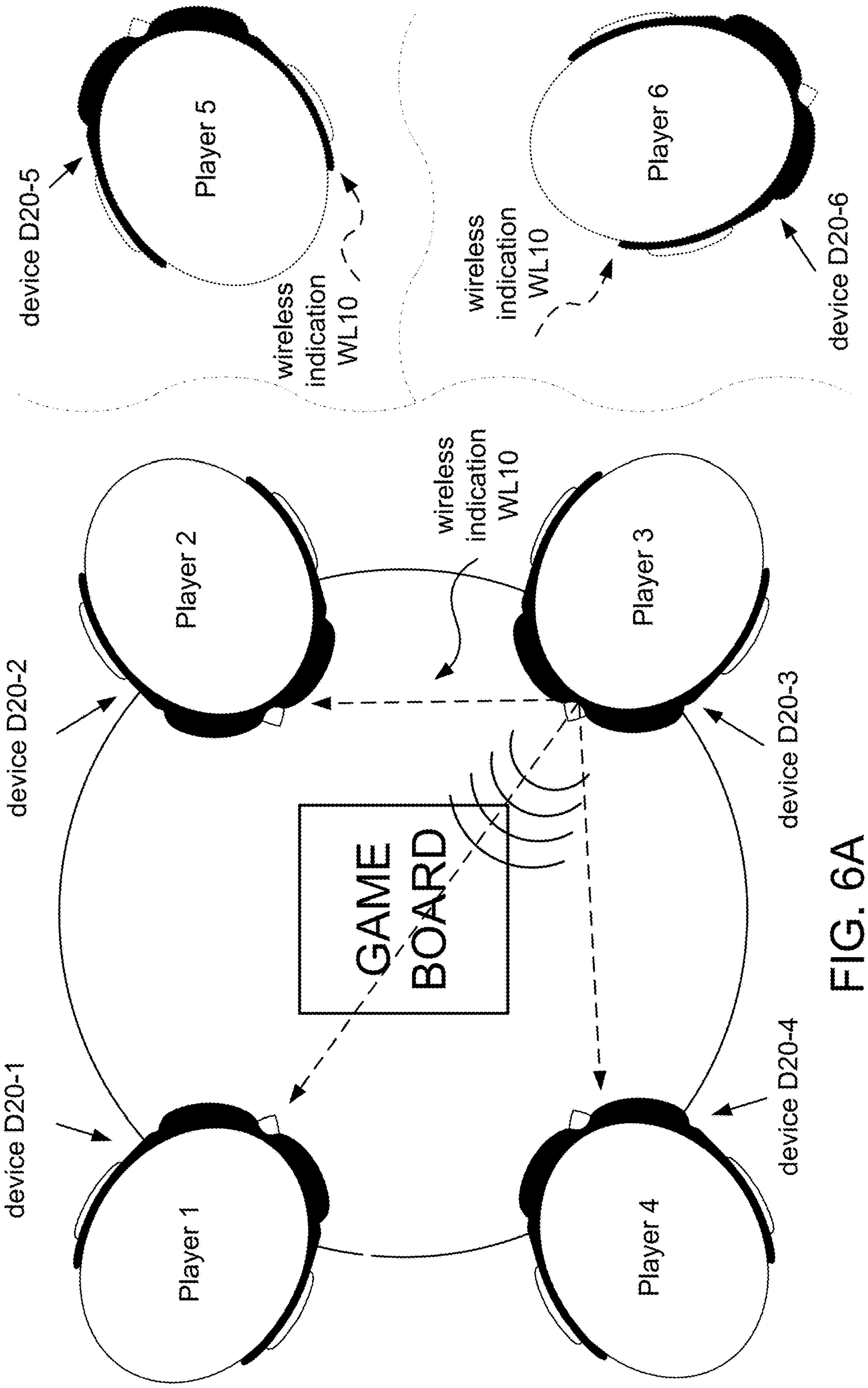
FIG. 6A shows an extension of the example of FIG. 5 in which two additional players are also participating from respective remote locations.

This example may also be extended to include participation in the XR shared space by remote participants. FIG. 6A shows such an extension, in which two additional players (players 5 and 6) are also participating from respective remote locations. Each remote player wears a corresponding device D20-5 or D20-6 (e.g., a hearable, headset, or other HMD as described herein) that includes at least one microphone, at least one loudspeaker, and a wireless transceiver. When one of the six players speaks (here, player 3), the devices of nearby players (if any) may detect the voice activity. The player's device also detects that she is speaking (e.g., based on volume level and/or directional sound processing) and uses the wireless transceiver to signal this detection and/or to transmit the player's voice to the other players' devices. For example, the wireless transceiver may signal this detection via sound, light, or radio to nearby players (if any), and may transmit the player's voice via radio to players who are not nearby (e.g., over a local-area network and/or a wide-area-network such as, for example, WiFi or a cellular data network). Because the voice belongs to one of the players, no ANC is activated by the devices in response to the detected voice activity.

Figure 6B:
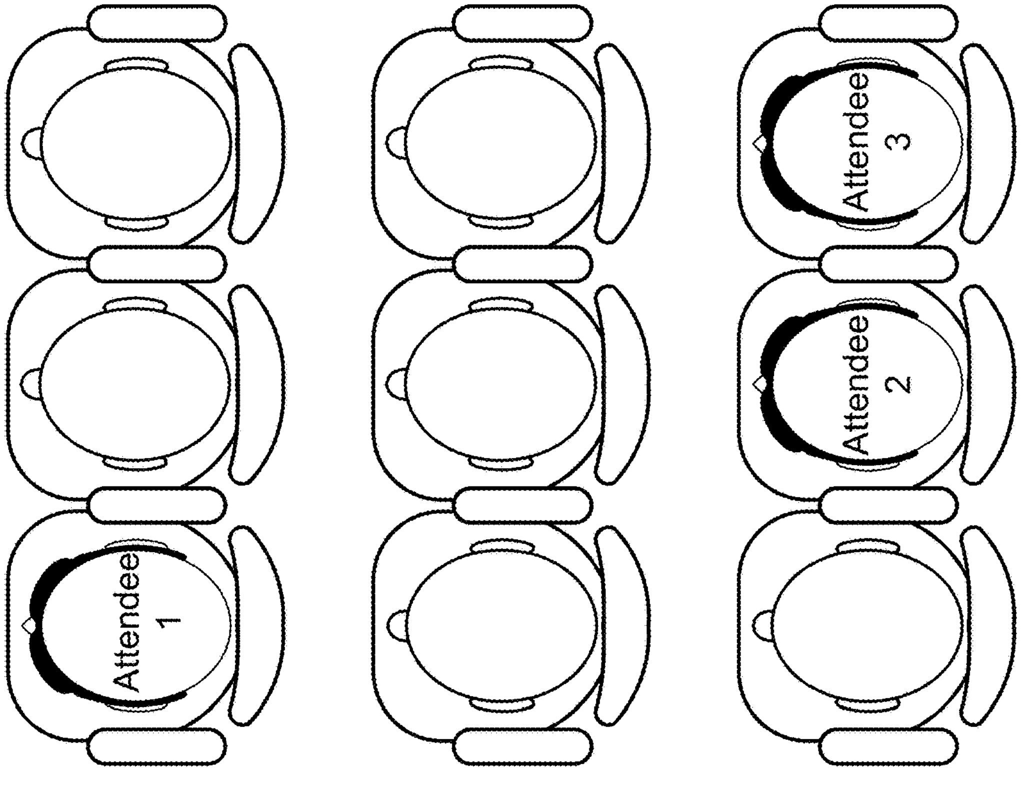
FIG. 6B shows an example of three persons participating in a video telephony application while in a shared physical space.

FIG. 6B illustrates a similar extension in which three attendees are participating in an XR shared space (e.g., a virtual conference room) while in a shared physical space (e.g., an airplane, train, or other mode of public transportation). In this example, the physical location of attendee 1 is vocally remote from the physical locations of attendees 2 and 3. For uses in a shared physical space that may have a high level of stationary background noise (e.g., as in this example), it may be desired to operate ANC system ANC10, in addition to selective cancellation of voice as described herein, to operate in a default mode that cancels the stationary noise.

Figure 6C:
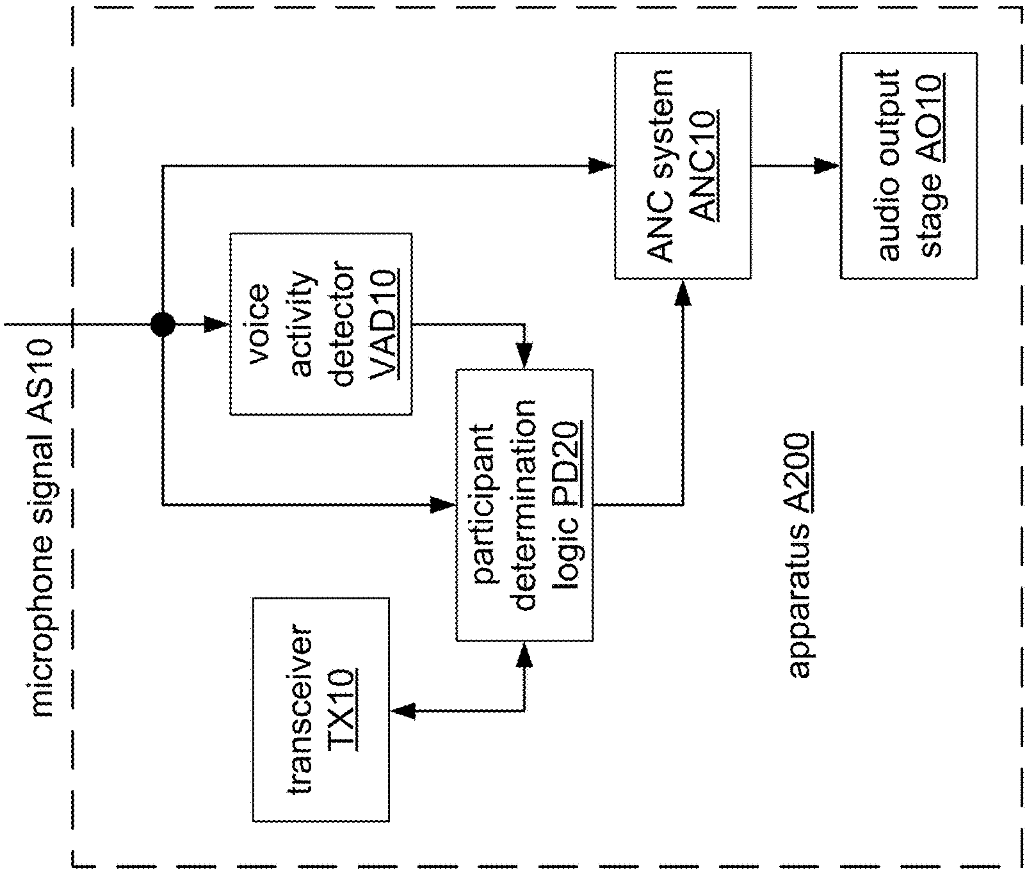
FIG. 6C shows a block diagram of an implementation A200 of apparatus A100.
Figure 7A:
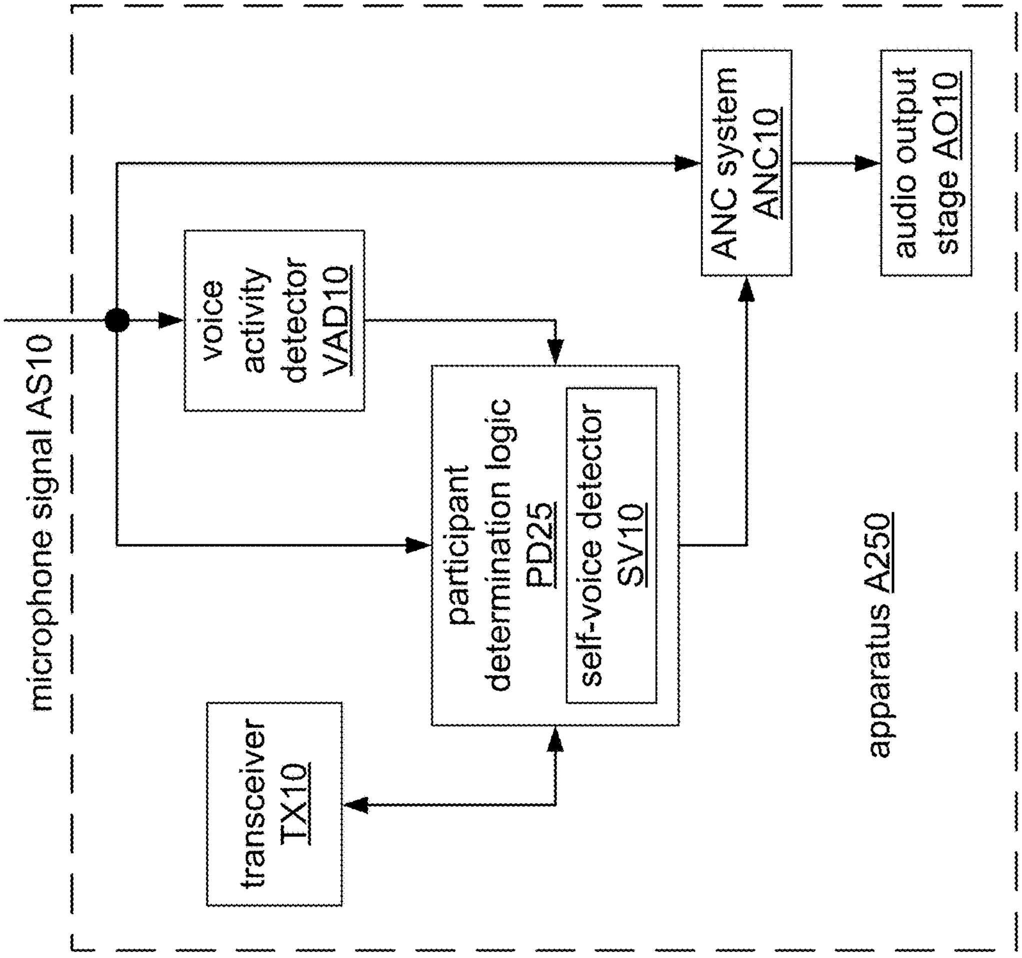
FIG. 7A shows a block diagram of an implementation A250 of apparatus A200.

FIG. 6C shows a block diagram of an implementation A200 of apparatus A100 that includes voice activity detector VAD10, an implementation PD20 of participant determination logic PD10, a transceiver TX10, ANC system ANC10, and audio output stage A010. FIG. 7A shows a block diagram of an implementation A250 of apparatus A200 in which an implementation PD25 of participant determination logic PD20 includes a self-voice detector SV10. If participant determination logic PD20 (e.g., self-voice detector SV10) determines that the detected voice activity is voice activity of a user of the device (e.g., as described above with reference to FIG. 1B), transceiver TX10 transmits an indication of this determination, and participant determination logic PD20 does not activate ANC system ANC10 to cancel the voice activity. Similarly, in response to transceiver TX10 receiving an indication that another participant is speaking, participant determination logic PD20 does not activate ANC system ANC10 to cancel the voice activity. Otherwise, participant determination logic PD20 activates ANC system ANC10 to cancel the detected voice activity. As described above, transceiver TX10 may also be configured to transmit the participant's voice (e.g., via radio and possibly over a local-area network and/or a wide-area-network such as, for example, WiFi or a cellular data network). Apparatus A200 may be included within, for example, a hearable, headset, or other HMD as described herein.

Figure 7B:
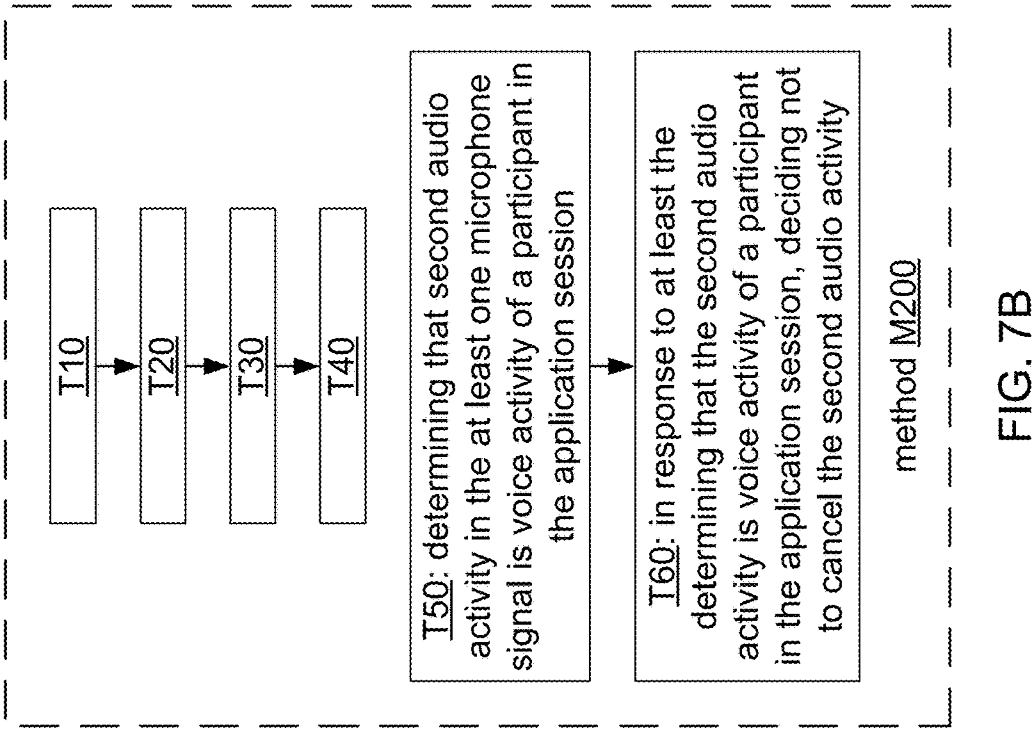
FIG. 7B shows a flow chart of an implementation M200 of method M100.

FIG. 7B shows a flow chart of an implementation M200 of method M100 that also includes tasks T50 and T60. Task T50 determines that second audio activity (e.g., audio activity detected at a second time that is different than the first time, or audio activity that is detected to be from a second direction that is different from the first direction) in the at least one microphone signal is voice activity of a participant in the application session (e.g., voice activity of a player, or of a user of a device). In response to at least the determining that the second audio activity is voice activity of a participant in the application session, task T60 decides not to cancel the second audio activity. A hearable, headset, or other HMD as described herein may be implemented to perform method M200.

Figure 8A:
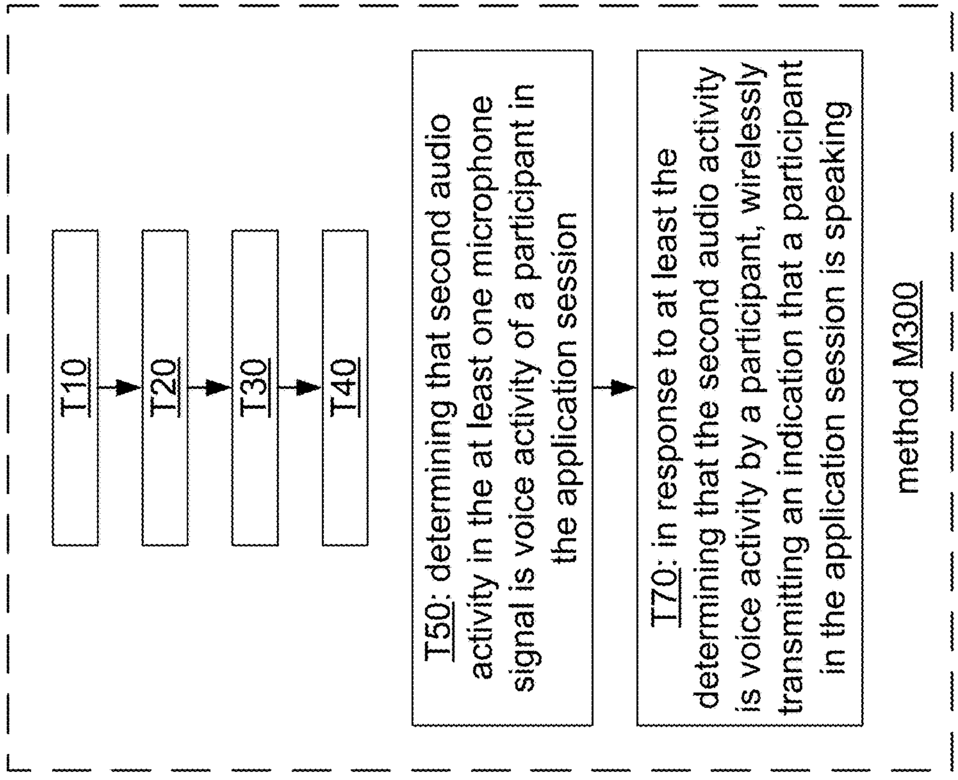
FIG. 8A shows a flow chart of an implementation M300 of method M100.
Figure 8B:
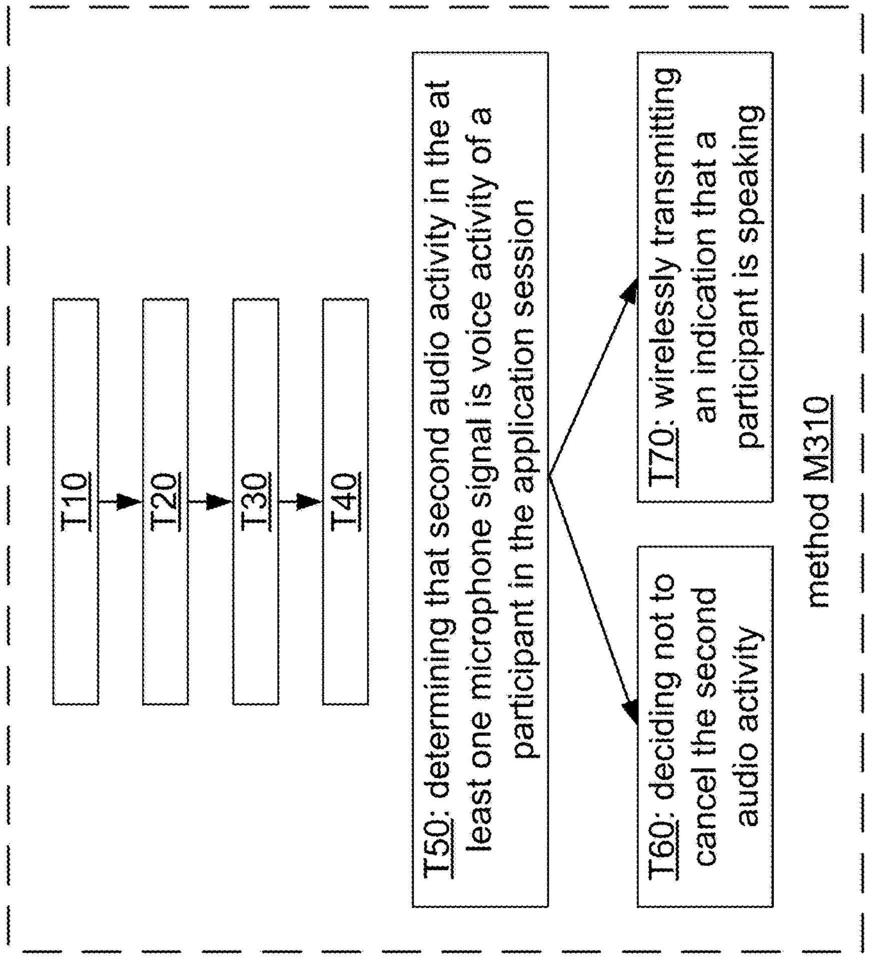
FIG. 8B shows a flow chart of an implementation M310 of methods M200 and M300.

FIG. 8A shows a flow chart of an implementation M300 of method M100 that also includes tasks T50 and T70. In response to at least the determining that the second audio activity is voice activity of a participant in the application session, task T70 wirelessly transmits an indication that a participant is speaking. The indication that a participant is speaking may include the second voice activity (e.g., the user's voice). FIG. 8B shows a flow chart of an implementation M310 of methods M200 and M300.

Figure 9B:
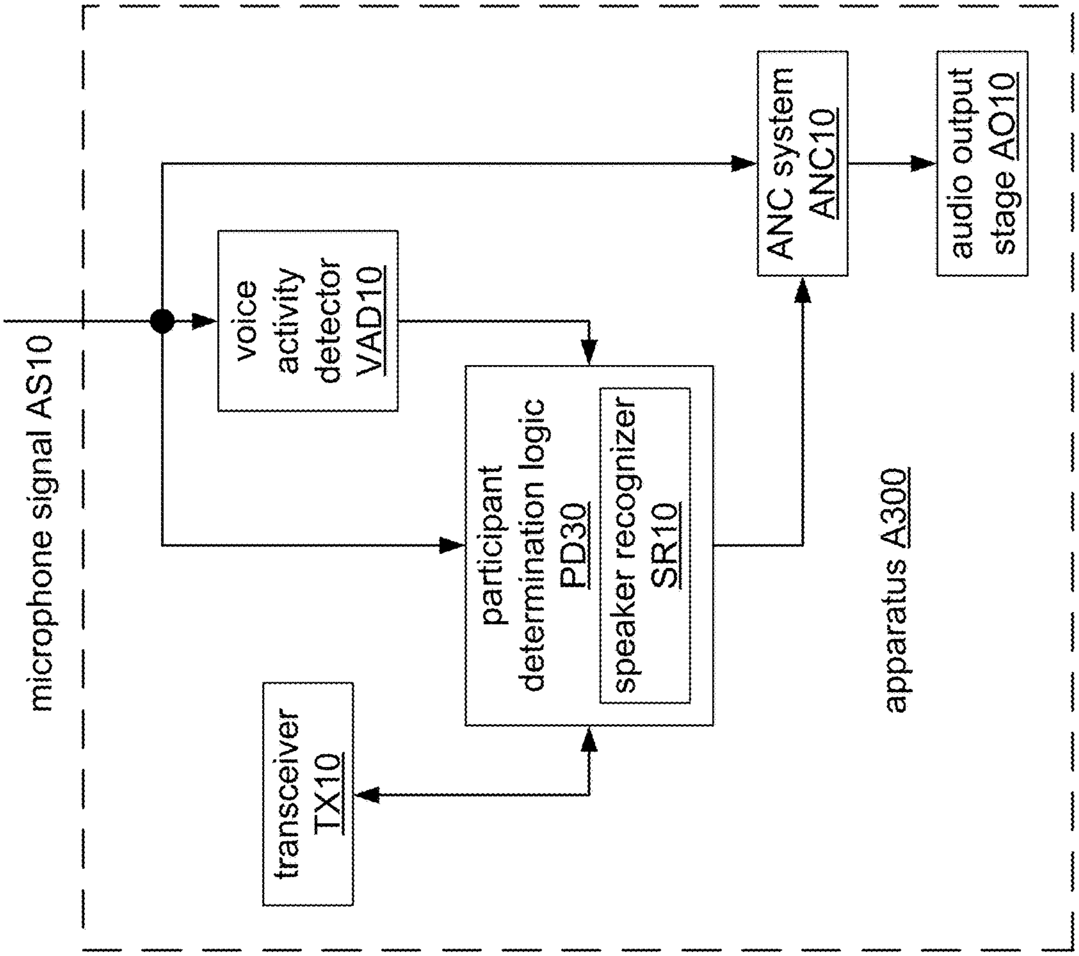
FIG. 9B shows a block diagram of an implementation A300 of apparatus A200.
Figure 9A:
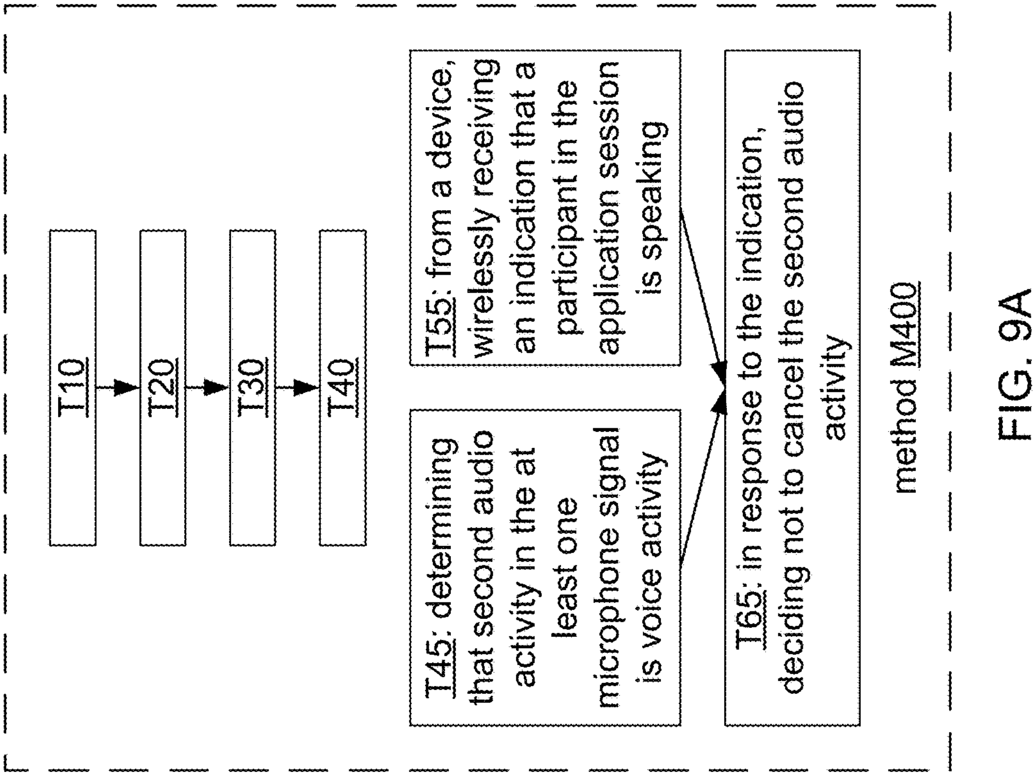
FIG. 9A shows a flow chart of an implementation M400 of method M100.

FIG. 9A shows a flow chart of an implementation M400 of method M100 that also includes tasks T45, T55, and T65. Task T45 determines that second audio activity in the at least one microphone signal is voice activity. From a device, task T55 wirelessly receives an indication that a participant in the application session (e.g., a player, or a user of the device) is speaking. In response to the indication, task T55 decides not to cancel the second audio activity.

As described above, a participant's device (e.g., self-voice detector SV10) may be configured to detect that the participant is speaking based on, for example, volume level and/or directional sound processing. Additionally or alternatively, the voice of a participant may be registered with the participant's own corresponding device (e.g., as an access control security measure), such that the device (e.g., participant determination logic PD20, task T50) may be implemented to detect that the participant is speaking by recognizing her voice.

Figure 10:
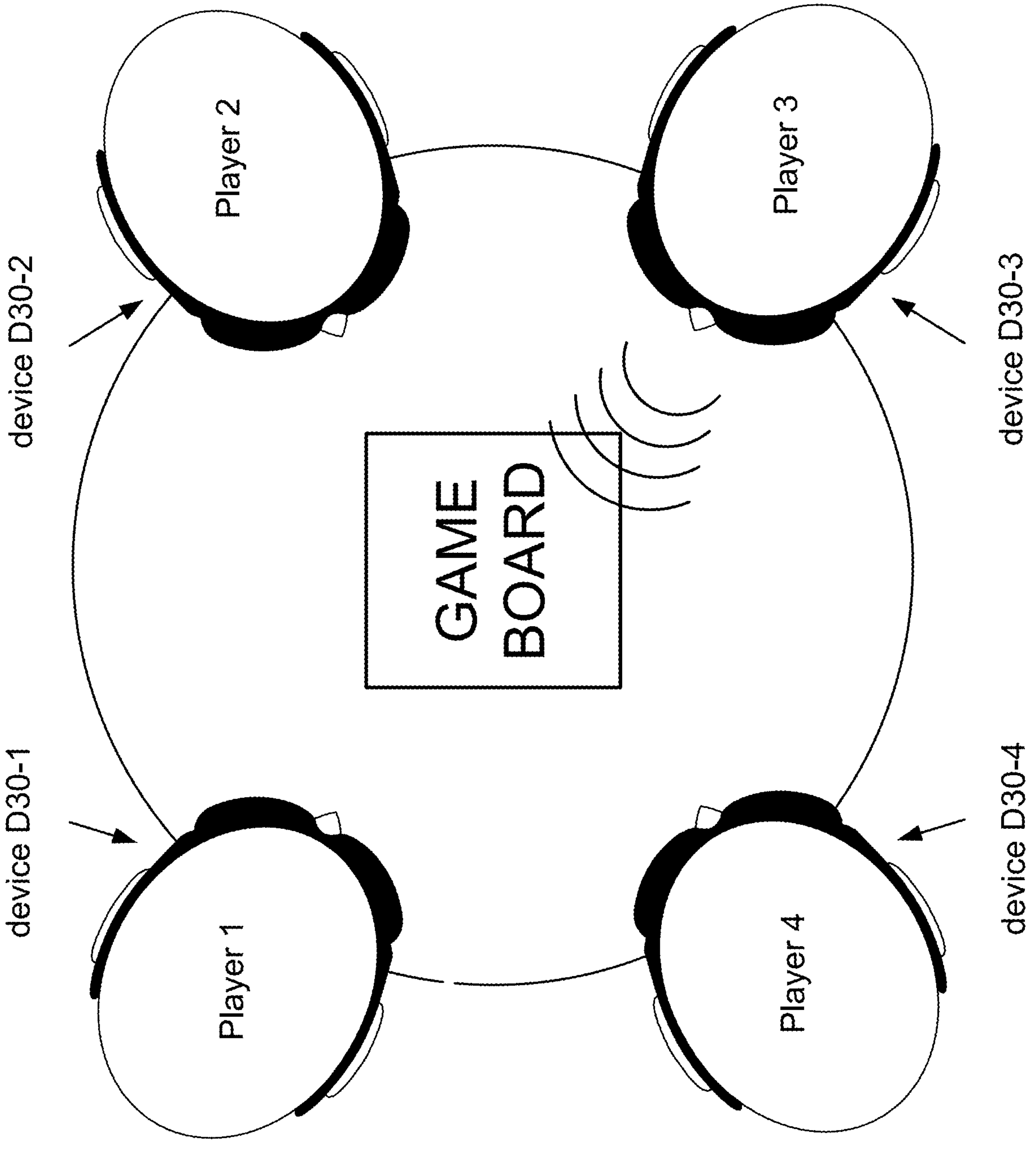
FIG. 10 shows an example in which four players are seated around a table playing an XR board game.

In a third example as shown in FIG. 10, four players are seated around a table playing an XR board game. Each of the players (here, players 1, 2, 3, and 4) wears a corresponding device D30-1, D30-2, D30-3, or D30-4 that includes at least one microphone, at least one loudspeaker, and a wireless transceiver. In this case, the system is configured to recognize each of the players' voices (using, for example, hidden Markov models (HMMs), Gaussian mixture models (GMMs), linear predictive coding (LPC), and/or one or more other known methods for speaker (voice) recognition). For example, each player may have registered her voice with a game server (for example, by speaking before the game begins in a registration step).

When one of the players speaks, the players' devices detect the voice activity, and one or more of the devices transmits the voice activity to the server (e.g., via a WiFi or a cellular data network). For example, a device may be configured to transmit the voice activity to the server upon detecting that the wearer of the device is speaking (e.g., based on volume level and/or directional sound processing). The transmission may include the captured sound or, alternatively, the transmission may include values of recognition parameters that are extracted from the captured sound. In response to the transmitted voice activity, the server wirelessly transmits an indication to the devices that the voice activity is recognized as speech of a player (e.g., that the voice activity is matched to one of the voices that has been registered with the game). Because the voice belongs to one of the players, no ANC is activated by the devices in response to the detected voice activity.

As an alternative to speaker recognition by the server, one or more of the devices may be configured to perform the speaker recognition locally, and to wirelessly transmit a corresponding indication of the speaker recognition to any other players' devices that do not perform the speaker recognition. For example, a device may perform the speaker recognition upon detecting that the wearer of the device is speaking (e.g., based on volume level and/or directional sound processing) and to wirelessly transmit an indication to the other devices upon recognizing that the voice activity is speech of a registered player. In this event, because the voice belongs to one of the players, no ANC is activated by the devices in response to the detected voice activity.

As the players who are physically present speak, VAD is triggered and their voices are matched to voices registered with the game, allowing other registered users (both local and remote) to hear them. As a remote player speaks, VAD is again triggered and matched so registered users can hear, and her voice is played through the devices of the other players. When a non-player speaks, because the detected voice activity is not speech of any player, it is not transmitted to the remote players.

For an implementation in which the players' voices are recognized, it may happen that a non-player would like to see and hear what is going on in the game. In this case, it may be possible for the non-player to pick up another headset, put it on, and now view what is going on in the game. But when the non-player converses with a person next to her, the registered players do not hear the conversation, because the voice of the non-player is not registered with the application (e.g., the game). In response to detecting the voice activity of the non-players, the players' devices continue to activate ANC to cancel that voice activity, because the non-players' voices are not recognized by the devices and/or by the game server.

Alternatively or additionally, the system may be configured to recognize each of the participants' faces and to use this information to distinguish speech by participants from speech by non-participants. For example, each player may have registered her face with a game server (for example, by submitting a self-photo before the game begins in a registration step), and each device (e.g., participant determination logic PD20, task T50) may be implemented to recognize the face of each other player (e.g., using eigenfaces, HMMs, the Fisherface algorithm, and/or one or more other known methods). The same registration procedure may be applied to other uses, such as a conferencing server. Each device may be configured to reject voice activity coming from a direction in which no recognized participant is present and/or to reject voice activity coming from a detected face that is not recognized.

FIG. 9B shows a block diagram of an implementation A300 of apparatus A200 that includes an implementation PD30 of participant determination logic PD20 which includes a speaker recognizer SR10. Participant determination logic PD30 determines that audio activity in at least one microphone signal AS10 is voice activity and determines whether the detected voice activity is voice activity of a user of the device (e.g., based on volume level and/or directional sound processing). If participant determination logic PD30 determines that the user is speaking, speaker recognizer SR10 determines whether the detected voice activity is recognized as speech of a registered speaker (e.g., by voice recognition and/or facial recognition as described herein). If speaker recognizer SR10 determines a match, then transceiver TX10 transmits an indication of this determination, and voice activity detector VAD20 does not activate ANC system ANC10. Similarly, in response to transceiver TX10 receiving an indication that another player is speaking, participant determination logic PD30 does not activate ANC system ANC10. Otherwise, participant determination logic PD30 activates ANC system ANC10 to cancel the detected voice activity. As described above, transceiver TX10 may also be configured to transmit the participant's voice (e.g., via radio and possibly over a local-area network and/or a wide-area-network such as, for example, WiFi or a cellular data network). Apparatus A300 may be included within, for example, a hearable, headset, or other HMD as described herein.

Any of the use cases described above may be implemented to distinguish between speech by a participant and speech by a non-participant that occurs at the same time. For example, a participant's device may be implemented to include an array of two or more microphones to allow incoming acoustic signals from multiple sources to be distinguished and individually accepted or canceled according to direction of arrival (e.g., by using beamforming and null beamforming to direct and steer beams and nulls).

A device and/or an application may also be configured to allow a user to select which voices to hear and/or which voices to block. For example, a user may choose manually to block one or more selected participants, or to hear only one or more participants, or to block all participants. Such a configuration may be provided in settings of the device and/or in settings of the application (e.g., a team configuration).

An application session may have a default context as described above, in which voices of non-participants are blocked using ANC but voices of participants are not blocked. It may be desired to provide for other contexts of an application session as well. For example, it may be desired to provide for contexts in which one or more participant voices may also be blocked using ANC. Several examples of such contexts (which may be indicated in session settings of the application) are described below.

Figure 11:
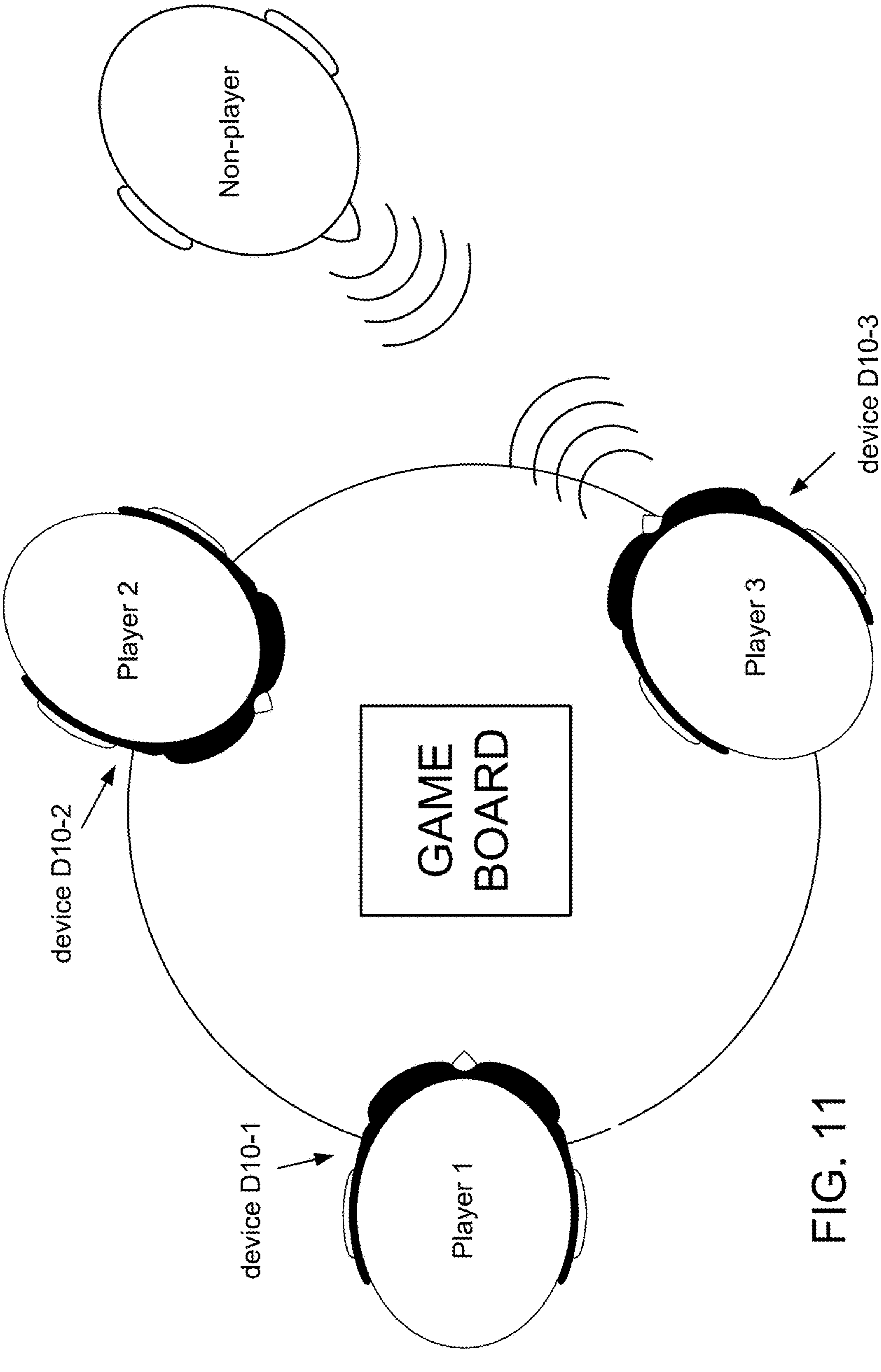
FIG. 11 shows an example of a player engaging in a conversation with a non-player.

In some contexts, a participant's voice may be disabled. A participant may desire to step out of the XR shared space for a short time, such that one or more external sounds which would have been blocked are now audible to the participant. On such an occasion, it may be desired for the participant to be able to hear the voice of a non-participant, but for the non-participant's voice to continue to be blocked for the participants who remain in the XR shared space. For example, it may be desired for a player to be able to engage in a conversation with a non-player (e.g., as shown in FIG. 11) without disturbing the other players. It may be desired that during the conversation, and for the other players, the voice of the conversing player (in this example, player 3) is blocked as well as the voices of non-players.

One approach for switching between operating modes is to implement keyword detection on the at least one microphone signal. In this approach, a player says a keyword or keyphrase (e.g., "pause," "let me hear") to leave the shared-space mode and enter an step-out mode, and the player says a corresponding different keyword or keyphrase (e.g., "play," "resume," "quiet") to leave the step-out mode and reenter the shared-space mode. In one such example, voice activity detector VAD10 is implemented to include a keyword detector that is configured to detect the designated keywords or keyphrases and to control ANC operation in accordance with the corresponding indicated mode. When the step-out mode is indicated, the keyword detector may cause participant determination logic PD10 to prevent the loudspeaker from producing an acoustic ANC signal (e.g., by blocking activation of the ANC system in response to voice activity detection, or by otherwise disabling the ANC system). (It may also be desired, during the step-out mode, for the participant's device to reduce the volume level of audio that is related to the XR shared space, such as game sounds and/or the voice of remote participants.) When the shared-space mode is indicated, the keyword detector may cause participant determination logic PD10 to enable the loudspeaker to produce an acoustic ANC signal (e.g., by allowing activation of the ANC system in response to voice activity detection, or by otherwise reenabling the ANC system). The keyword detector may also be implemented to cause participant determination logic PD10 to transmit an indication of a change in the device's operating mode to the other players' devices (e.g., via transceiver TX10) so that the other players' devices may allow or block voice activity by the player according to the operating mode indicated by the player's device.

Another approach for switching between operating modes is to implement a change of operating mode in response to user movement (e.g., changes in body position). For players seated in a circle around a game board, for example, a player may switch from play mode to a step-out mode by moving or leaning out of the circle shared by the players, and may leave the step-out mode and reenter play mode by moving back into the circle (e.g., allowing VAD/ANC to resume). In one example, a player's device includes a Bluetooth module (or is associated with such a module, such as in a smartphone of the player) that is configured to indicate a measure of proximity to devices of nearby players that also include (or are associated with) Bluetooth modules. The player's device may also be implemented to transmit an indication of a change in the device's operating mode to the other players' devices (e.g., via transceiver TX10) so that the other players' devices may allow or block voice activity by the player according to the operating mode indicated by the player's device.

In another example, a participant's device includes an inertial measurement unit (IMU), which may include one or more accelerometers, gyroscopes, and/or magnetometers. Such a unit may be used to track changes in the orientation of the user's head relative to, for example, a direction that corresponds to the shared virtual space. For a scenario as in FIG. 11, for example, an IMU of a player's device may be implemented to track the orientation of the player's head relative to the center of the game board, to indicate a change to step-out mode when the difference exceeds a first threshold angle (e.g., plus or minus one hundred degrees), and to indicate a return to play mode when the difference falls below a second threshold angle (e.g., plus or minus eighty degrees). For a remote-player scenario as in FIG. 6A, a direction that corresponds to the shared virtual space may also be assigned to or selected by each remote player, so that the remote player may switch from play mode to a step-out mode by turning away from the game direction in a similar manner. A participant's device may also be implemented to transmit an indication of a change in the device's operating mode to the other participants' devices (e.g., via transceiver TX10) so that the other participants' devices may allow or block voice activity by the participant according to the operating mode indicated by the participant's device.

Figure 12:
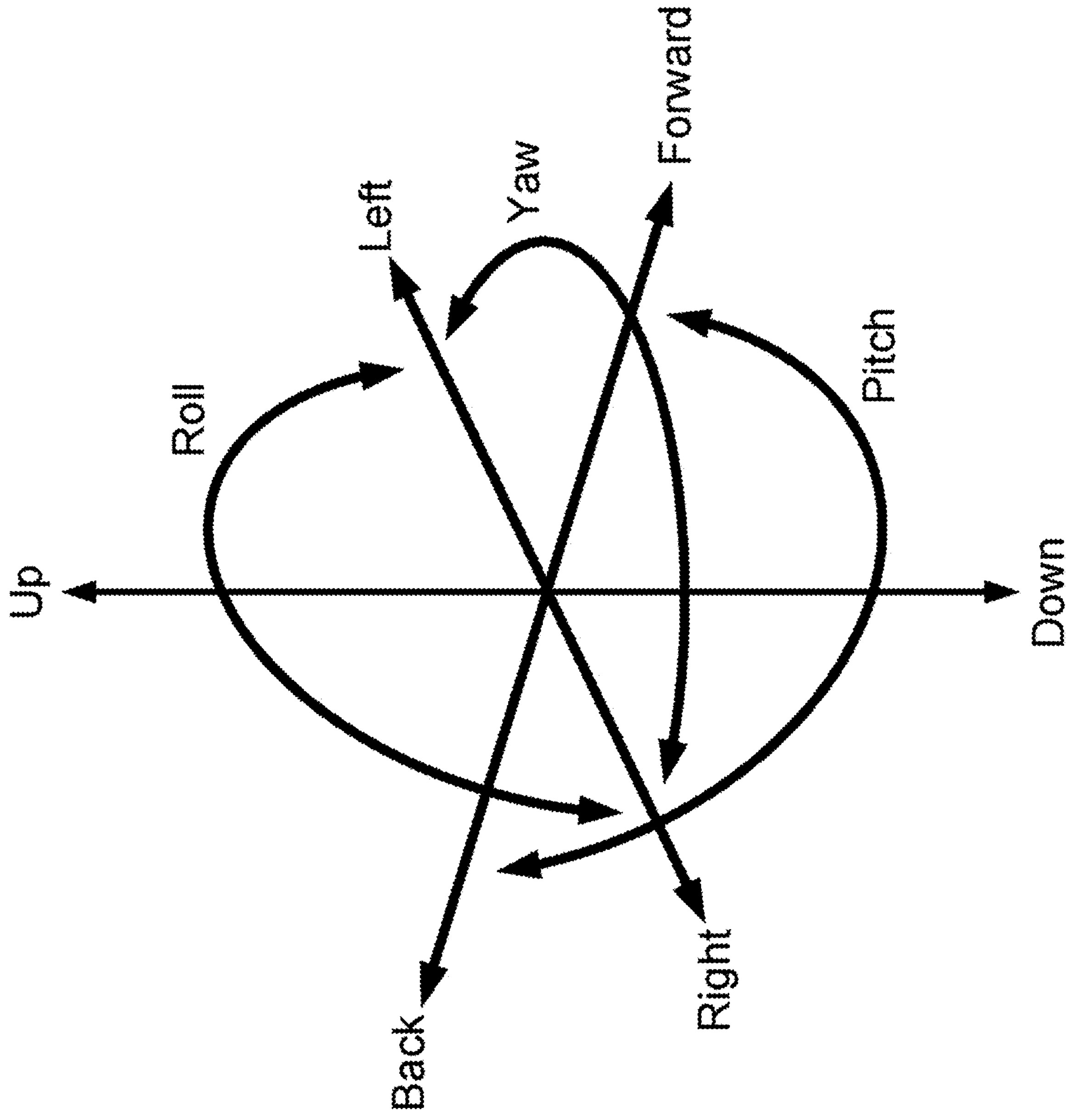
FIG. 12 illustrates the six degrees indicated by 6DOF.

In order to support an immersive XR experience, it may be desired for the IMU to detect movement in three degrees of freedom (3DOF) or in six degrees of freedom (6DOF). As shown in FIG. 12, 6DOF includes the three rotational movements of 3DOF (yaw, pitch, and roll) and also three translational movements: forward/backward (surge), up/down (heave), and left/right (sway).

A further approach for switching between operating modes is based on information from video captured by a camera (e.g., a forward-facing camera of a player's device). In one example, a participant's device is implemented to determine, from video captured by a camera (e.g., a camera of the device), the identity and/or the relative direction of a person who is speaking. A face detected in a video capture may be associated with detected voice activity by a correlation in time and/or direction between the voice activity and movement of the face (e.g., mouth movement, such as a motion of the lips). As described above, the system may be configured to recognize each of the participants' faces and to use this information to distinguish speech by participants from speech by non-participants.

Figure 13:
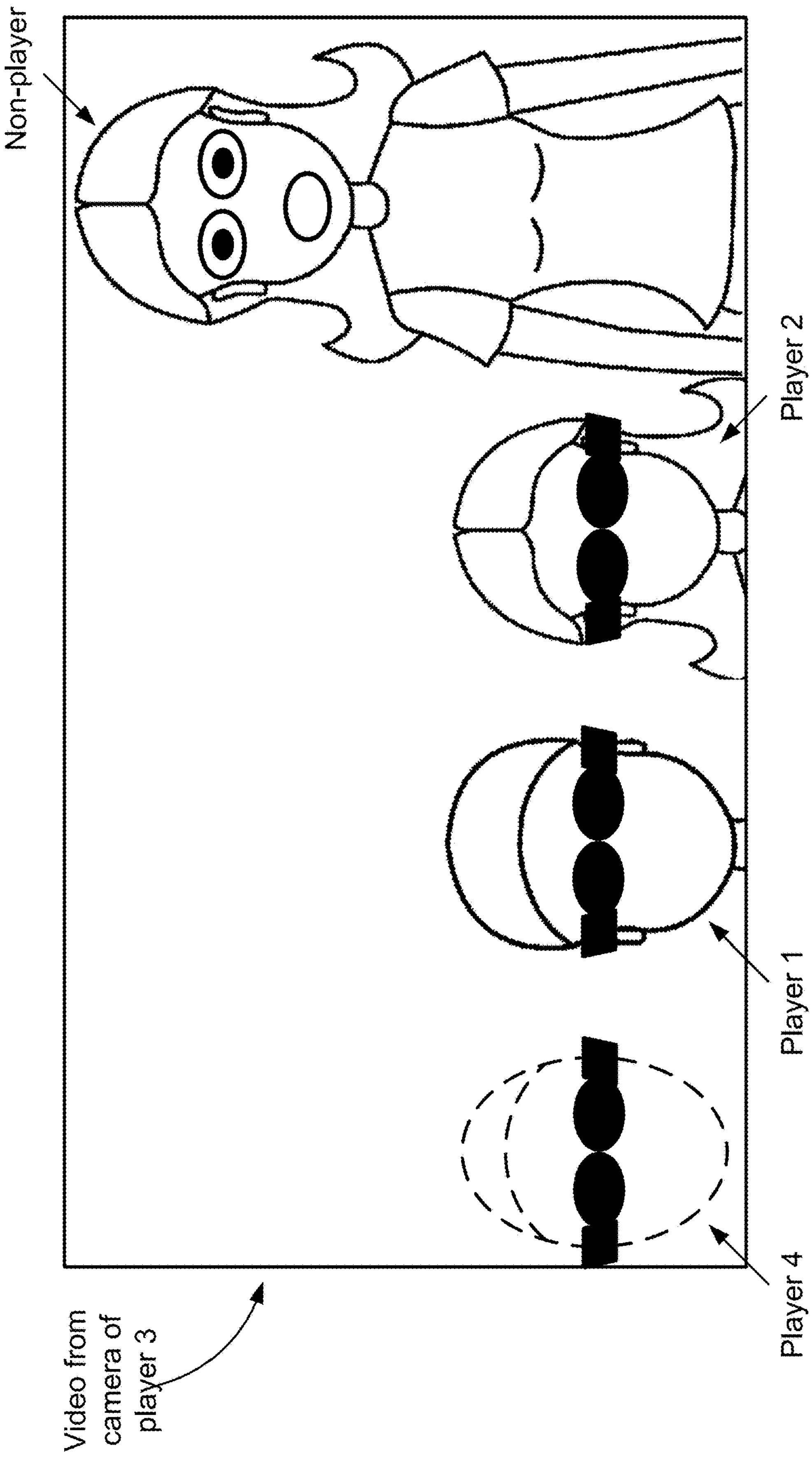
FIG. 13 shows an example of video from a forward-facing camera of a device of a player.

A device may be configured to analyze video from a camera that faces in the same direction as the user and to determine, from a gaze direction of a person who is speaking, whether the person is speaking to the user. FIG. 13 shows an example of video from a forward-facing camera of a device of player 3. Players 1 and 2 are within the camera's field of view, and the player's video also includes an avatar of remote player 4 at an assigned location within the shared virtual space. In this example, the player is looking in the direction of a speaking non-player, whose gaze is directed at the player. (The player's device may also be configured to determine that the player's gaze is directed at the speaking non-player.) The player's device may be configured to switch from play mode to a step-out mode in response to this gaze detection, thus allowing the player to hear the non-player. The player's device may also be configured to transmit an indication of the mode change to the devices of other players, so that while the player is speaking to the non-player, the player's voice is cancelled by ANC for these other players and is blocked by (and/or is not transmitted to) the remote players.

The player's device may be configured to switch from the step-out mode back to play mode in response to the player looking back toward the game or at another player, or in response to a determination that the gaze of the speaking non-player is no longer detected. The player's device may also be configured to transmit an indication of the mode change to the devices of other players, so that the voice of the player is no longer cancelled.

Figure 14:
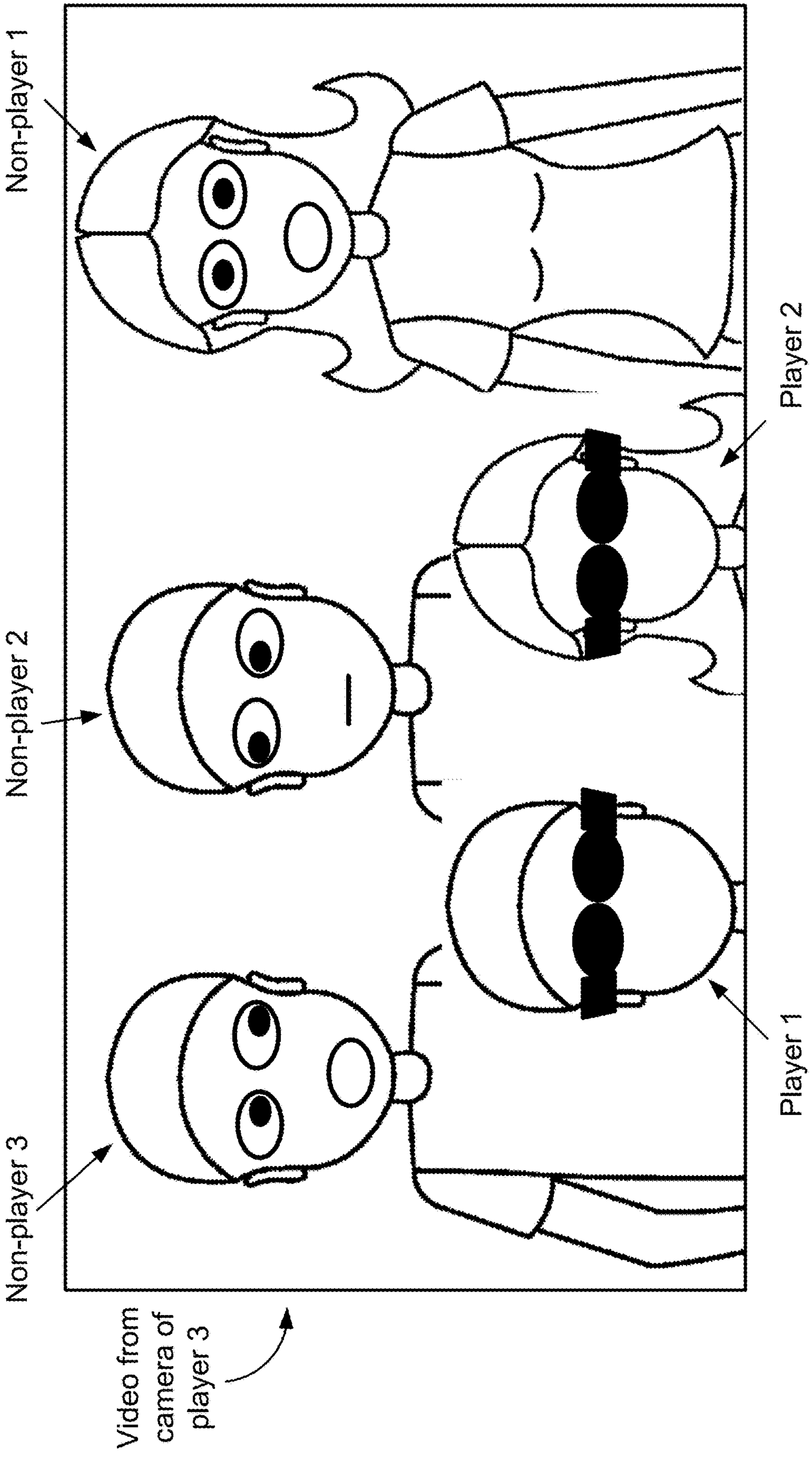
FIG. 14 shows another example of video from a forward-facing camera of a device of a player.

FIG. 14 shows an example of video from a forward-facing camera of a device of player 3 that may be used to distinguish speech from the direction of speaking non-player 1, whose gaze is directed at the player, from speech from the direction of speaking non-player 3, whose gaze is not directed at the player. The device may be implemented to perform directional audio processing (e.g., beamforming, null beamforming) to allow the user to converse with non-player 1 while attenuating the speech of non-player 3.

It may be desired to implement a mode change detection as described herein (e.g., by keyword detection, user movement detection, and/or gaze detection as described above) to include hysteresis and/or time windows. Before a change from one mode to another is indicated, for example, it may be desired to confirm that the mode change condition persists over a certain time interval (e.g., one-half second, one second, or two seconds). Additionally or alternatively, it may be desired to use a higher mode change threshold value (e.g., on a user orientation parameter, such as the angle between the user's facing direction and the center of the shared virtual space) for indicating an exit from play mode than for indicating a return to play mode. To ensure robust operation, a mode change detection may be implemented to require a contemporaneous occurrence of two or more trigger conditions (e.g., keyword, user movement, non-player face recognized, etc.) to change mode.

Figure 15A:
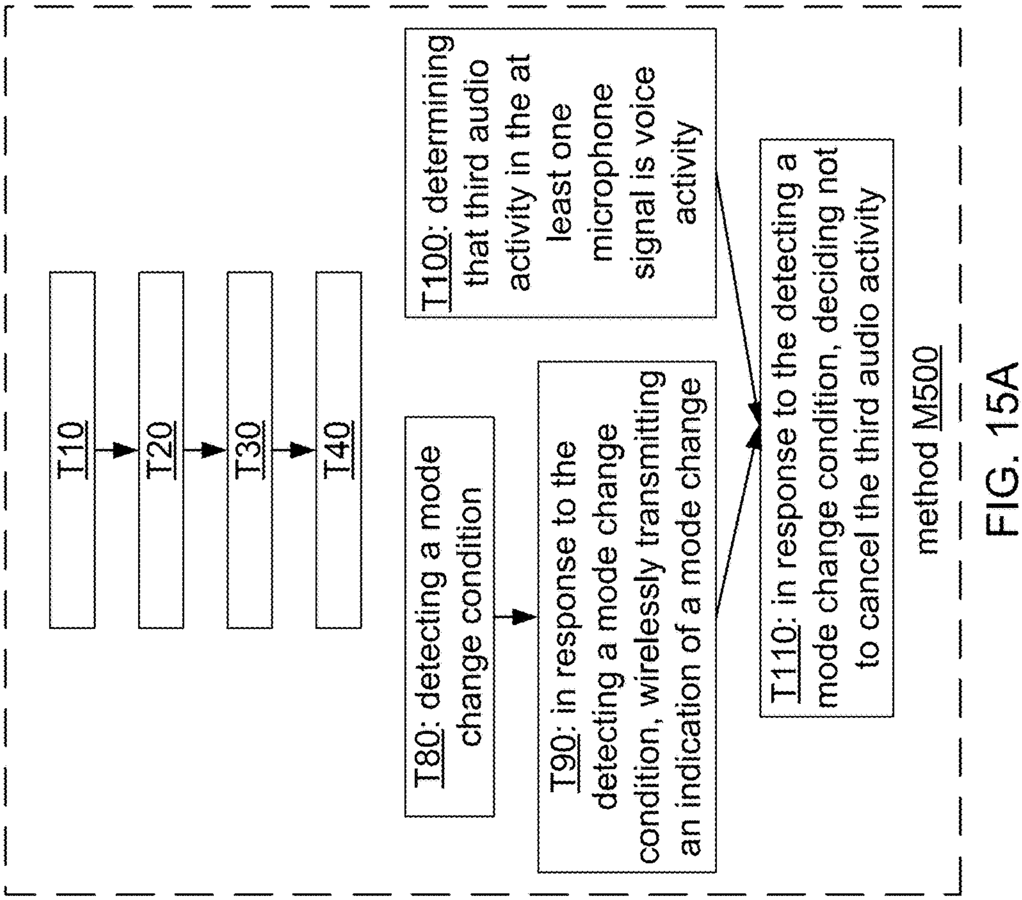
FIG. 15A shows a flow chart of an implementation M500 of method M100.

FIG. 15A shows a flow chart of an implementation M500 of method M100 that also includes tasks T80, T90, T100, and T110. Task T80 detects a mode change condition (e.g., by keyword detection, user movement detection, and/or gaze detection as described above). In response to the detecting a mode change condition, task T90 wirelessly transmits an indication of a mode change. Task T100 determines that third audio activity in the at least one microphone signal is voice activity. In response to the detecting a mode change condition, task T110 decides not to cancel the third audio activity (e.g., by not performing an ANC operation to cancel the third audio activity). Method M500 may also be implemented as an implementation of any of methods M200, M300 or M400.

Figure 15B:
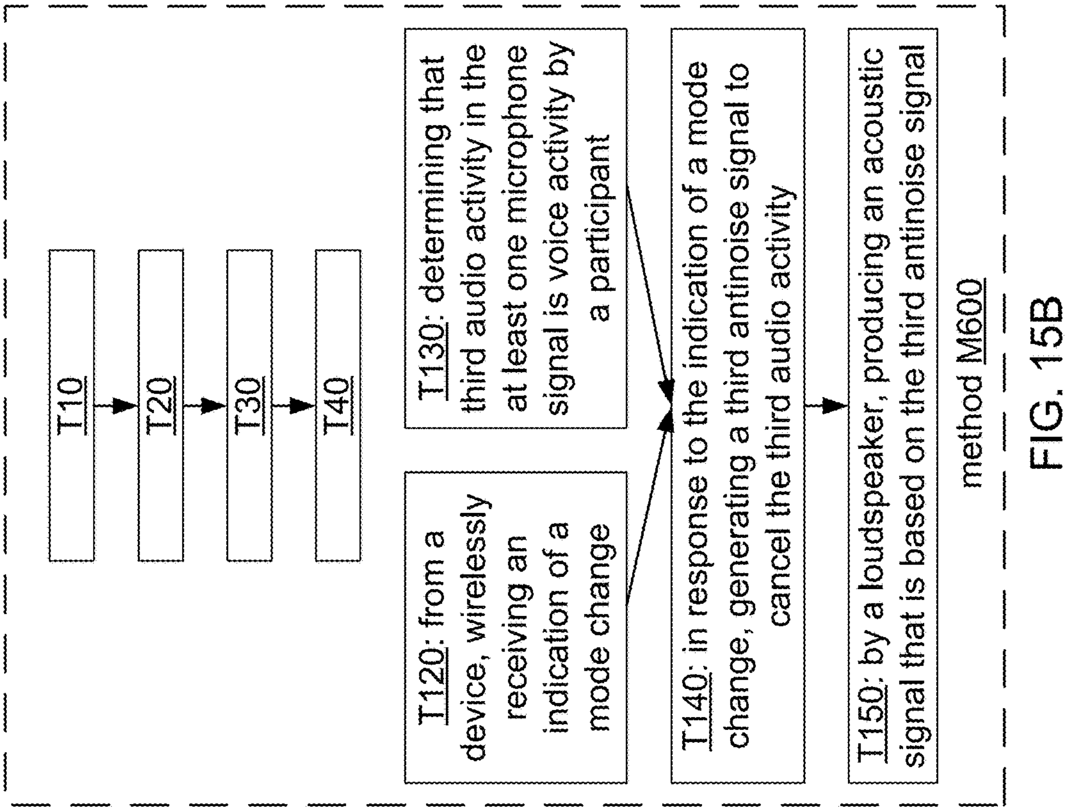
FIG. 15B shows a flow chart of an implementation M600 of method M100.

FIG. 15B shows a flow chart of an implementation M600 of method M100 that also includes tasks T120, T130, T140, and T150. From a device, task T120 wirelessly receives an indication of a mode change. Task T130 determines that third audio activity in the at least one microphone signal is voice activity by a user. In response to the indication of a mode change, task T140 generates a third antinoise signal to cancel the third audio activity. By a loudspeaker, task T150 produces an acoustic signal that is based on the third antinoise signal. Method M600 may also be implemented as an implementation of any of methods M200, M300 or M400.

In traditional gameplay, teammates have no way to secretly share information except to come within close proximity to each other and whisper. It may be desired to support a mode of operation in which two or more teammates (e.g., whether nearby or remote) may privately discuss virtual strategy without being overheard by members of an opposing team. It may be desired, for example, to use facial recognition and ANC within an AR game environment to support team privacy and/or to enhance team vocalizations (e.g., by amplifying a teammate's whisper to a player's ears). Such a mode may also be extended so that the teammates may privately share virtual strategy plans without members of an opposing team being able to see the plans. (The same example may be applied to, for example, members of a subgroup during another XR shared-space experience as described herein, such as members of a subcommittee during a virtual meeting of a larger committee.)

Figure 16:
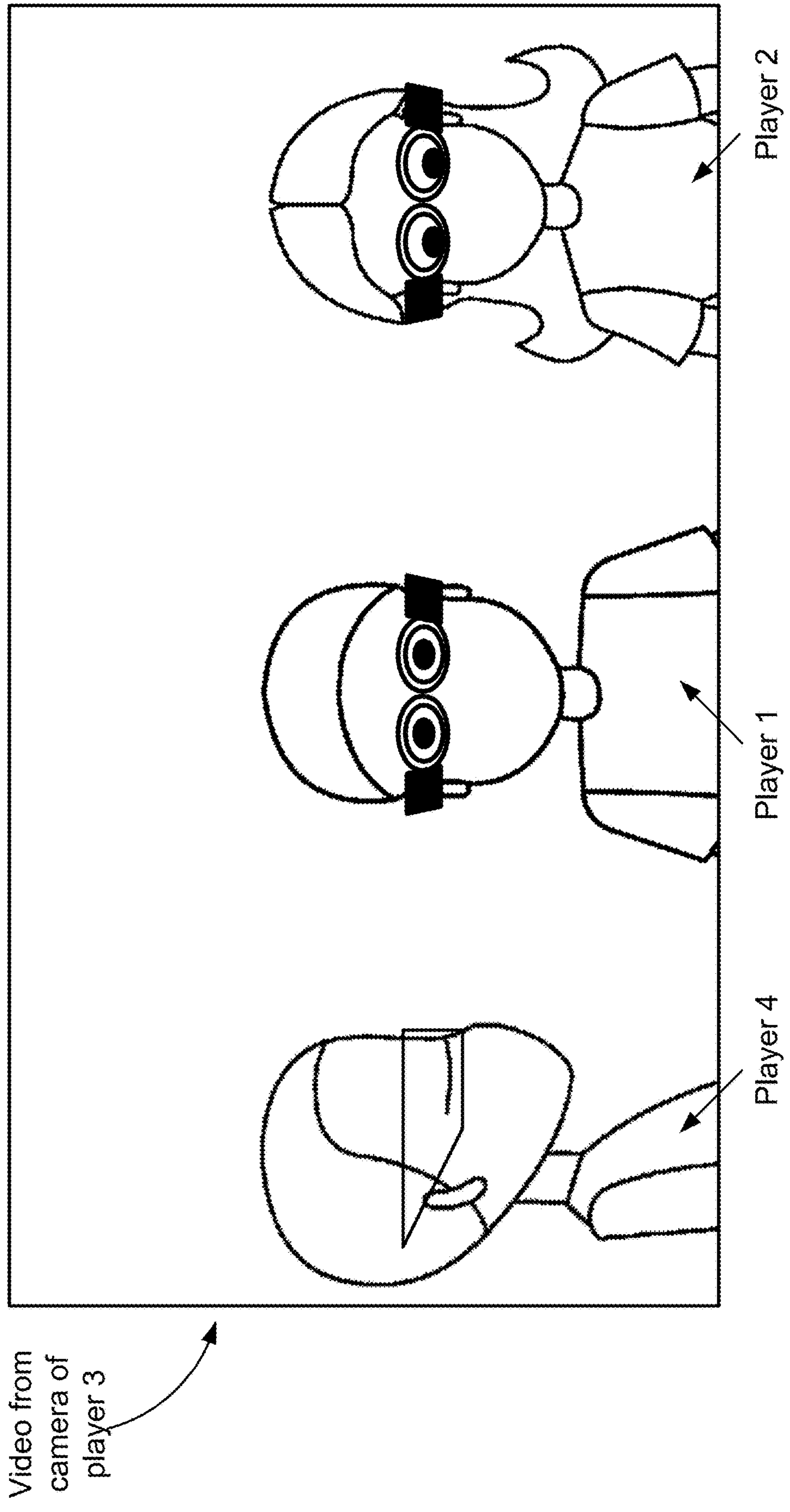
FIG. 16 shows an example in which a player is facing a teammate player and a non-teammate player, with another non-teammate player nearby.
Figure 17:
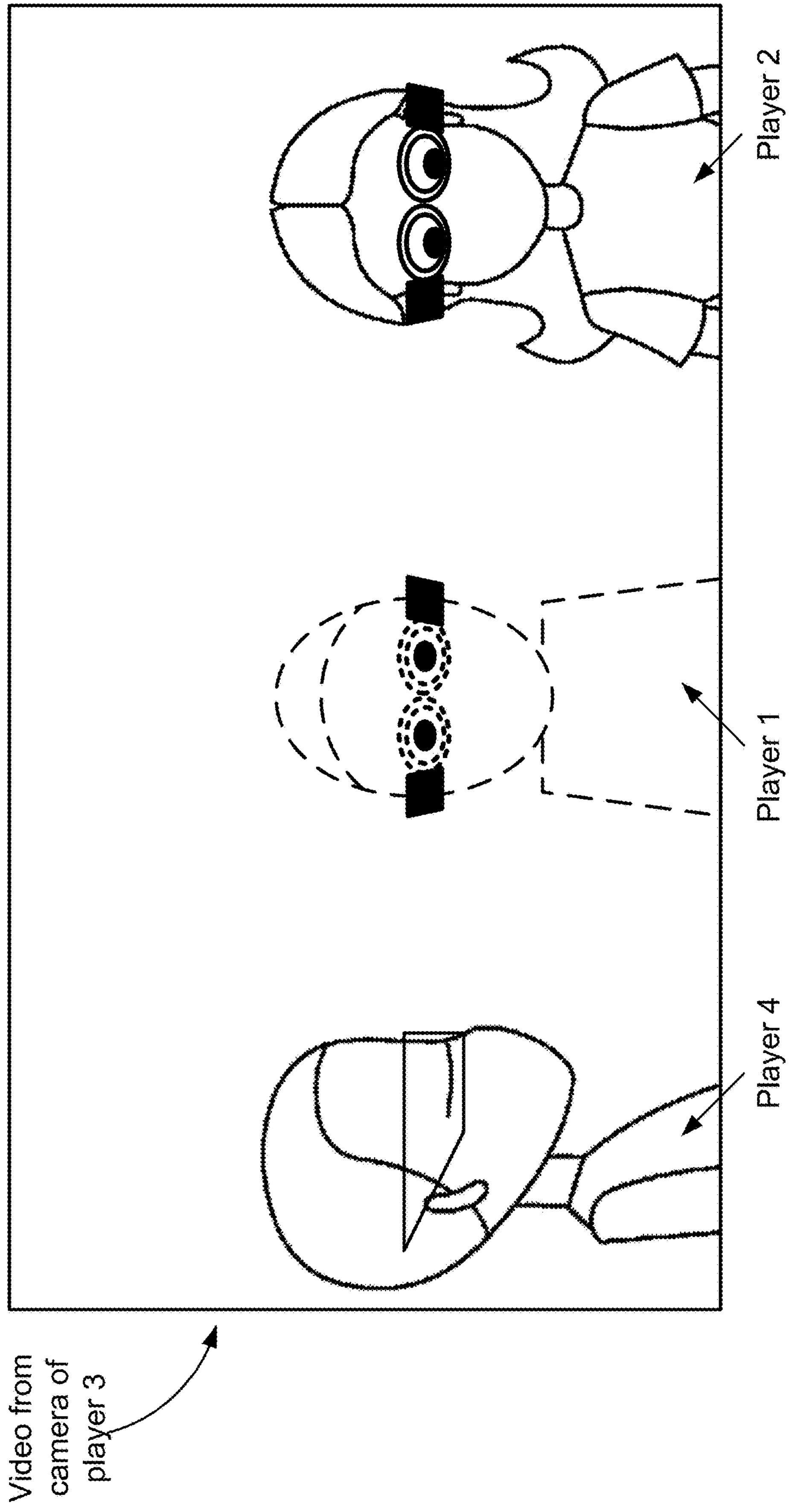
FIG. 17 shows an example in which a player is facing, in the shared virtual space, a teammate player who is virtually present.

FIG. 16 shows an example in which player 3 is facing teammate player 1 and non-teammate player 2, with another non-teammate player 4 nearby. In another example, two players on the same team may each be wearing a headset and be seated on the same side of the game board but not really near each other. One of the players looks over at a teammate, which triggers (e.g., by gaze detection) facial recognition. In the example of FIG. 16, the gaze of player 1 is directed at player 3. In response to the trigger, the system determines that players 1 and 3 are teammates by face recognition (based on, for example, a prior facial registration step), which completes detection of the mode change condition to team private mode. For example, the device of player 1 may recognize the face of player 3 as a teammate, and vice versa. As shown in FIG. 17, such a team privacy mode may be implemented even for remote teammates who are only virtually present.

In response to the mode change condition, the system transmits an indication of a change in the device's operating mode to the other players' devices. For example, in this case the device of player 1 and/or the device of player 3 may be implemented to transmit, in response to the mode change condition, an indication of a change in the device's operating mode to the other players' devices (e.g., via transceiver TX10). In response to the mode change indication, the non-teammates' devices block voice activity by players 1 and 3 (and possibly by other players who are identified as their teammates) in accordance with the indicated operating mode. One teammate can now privately discuss (or even whisper) and visually share strategy plans/data with other teammates without members of the opposing team hearing/seeing them, because the devices of opposing team members activate ANC to cancel the voice activity. Among the devices of the teammates, the mode change indication may cause the devices to amplify teammate voice activity (e.g., to amplify teammate whispers). Looking away from a teammate resumes normal play operation, in which all player vocalizations can be heard by all players. In a related context, the voice of a particular participant (e.g., a coach) is audible only to one or more selected other participants and is blocked for the other participants.

The XR shared space need not be an open space, such as a meeting room. For example, it may include virtual walls or other virtual acoustic barriers that would reduce prevent one participant from hearing another participant if it were real. In such instances, the application may be configured to track the participant's movement (e.g., using data from an IMU (inertial measurement unit) and a simultaneous mapping and localization (SLAM) algorithm) and to update the participant's location within the XR shared space accordingly. The application may be further configured to modify the participant's audio experience according to features of the XR shared space, such as structures or surfaces that would block or otherwise modify sound (e.g., muffle, cause reverberation, etc.) if physical.

Figure 18:
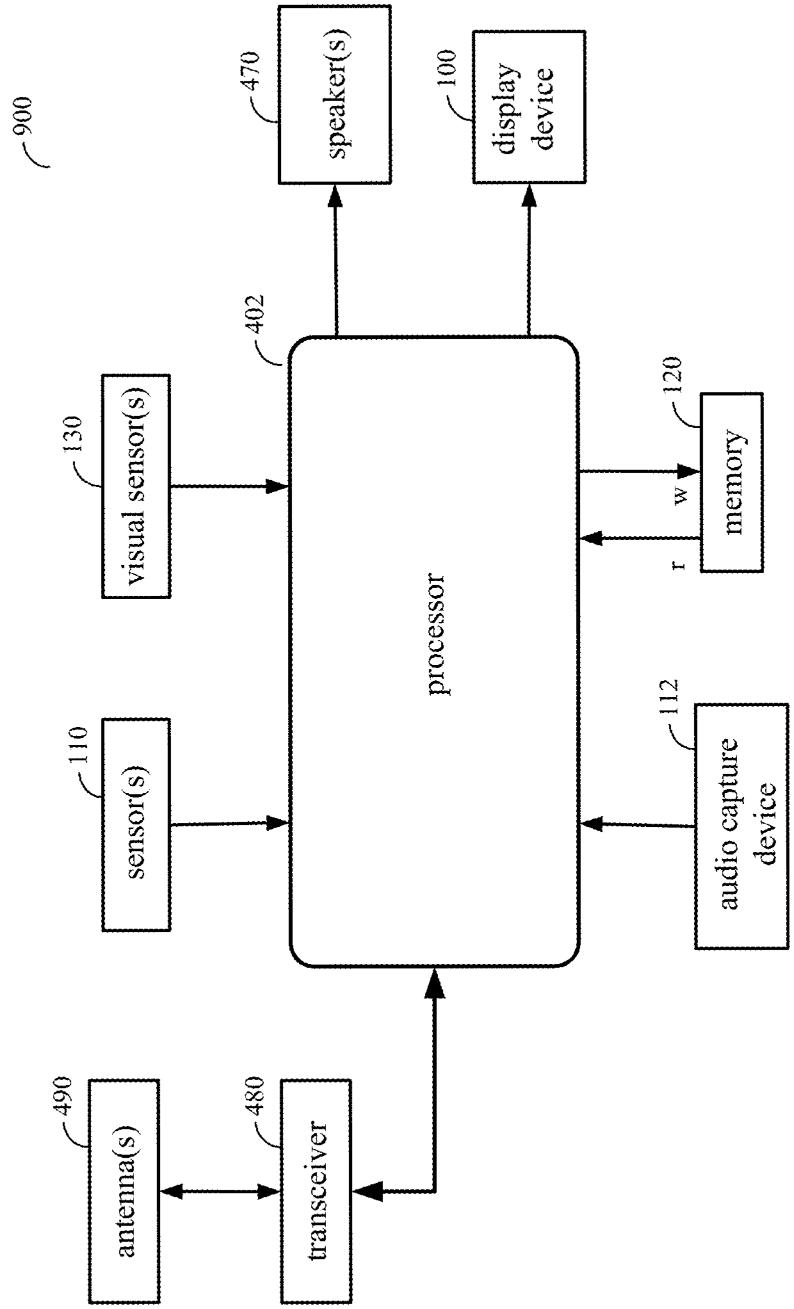
FIG. 18 shows a block diagram of a system 900 that may be implemented within a device as described herein.

FIG. 18 shows a block diagram of a system 900 that may be implemented within a device as described herein (e.g., device D10-1, D20-2, or D30-1). System 900 may be implemented to include an implementation of an apparatus as described herein (e.g., apparatus A100, A200, A250, A300) and/or to perform an implementation of a method as described herein (e.g., method M100, M200, M300, M310, M400, M500, M600). System 900 includes a processor 402 (e.g., one or more processors) that may be configured, for example, to perform a method as described herein. System 900 also includes a memory 120 coupled to processor 402, sensors 110 (e.g., ambient light sensors of device 800, orientation and/or tracking sensors), visual sensors 130 (e.g., infrared (IR) sensors, tracking and recording cameras, eye-tracking cameras, and rear camera of device 800), display device 100 (e.g., optics/projection of device 800), audio capture device 112 (e.g., high-sensitivity microphones of device 800), loudspeakers 470 (e.g., headphones 404 of device 400, directional speakers of device 800), transceiver 480, and antennas 490.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least." Unless otherwise indicated, the terms "at least one of A, B, and C," "one or more of A, B, and C," "at least one among A, B, and C," and "one or more among A, B, and C" indicate "A and/or B and/or C." Unless otherwise indicated, the terms "each of A, B, and C" and "each among A, B, and C" indicate "A and B and C."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

The various elements of an implementation of an apparatus or system as disclosed herein may be embodied in any combination of hardware with software and/or with firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs (digital signal processors), FPGAs (field-programmable gate arrays), ASSPs (application-specific standard products), and ASICs (application-specific integrated circuits). A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 (or another method as disclosed with reference to operation of an apparatus or system described herein), such as a task relating to another operation of a device or system in which the processor is embedded (e.g., a voice communications device, such as a smartphone, or a smart speaker). It is also possible for part of a method as disclosed herein to be performed under the control of one or more other processors.

Each of the tasks of the methods disclosed herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers.

Combinations of the above should also be included within the scope of computer-readable media.

In one example, a non-transitory computer-readable storage medium comprises code which, when executed by at least one processor, causes the at least one processor to perform a method of audio signal processing as described herein.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An extended reality headset for audio signal processing, the extended reality headset comprising:

a memory configured to store at least one microphone signal; and a processor coupled to the memory and configured to:

determine that first audio activity in the at least one microphone signal is voice activity of a first participant in an application session active between at least the first participant and a second participant, wherein the first participant is a user of the extended reality headset and the second participant is a user of a device;

determine a context of the first participant with respect to the application session, wherein the context indicates that at least one of a voice of the first participant in the application session is currently disabled, the first participant in the application session is in a private mode with at least one other participant of the application session, or the voice of the first participant in the application session is blocked by a virtual barrier;

based at least on the determined context of the first participant with respect to the application session and the determination that the first audio activity is voice activity of the first participant in the application session active on the device, generate an antinoise signal to cancel the first audio activity including the voice activity of the first participant in the application session active on the device; and cause a loudspeaker to produce an acoustic signal that is based on the antinoise signal.

2. The extended reality headset according to claim 1, wherein the processor is further configured to:

determine that second audio activity in the at least one microphone signal is voice activity of a non-participant in the application session;

based at least on the determination that the second audio activity is voice activity of the non-participant in the application session, generate an antinoise signal to cancel the second audio activity; and cause the loudspeaker to produce an acoustic signal that is based on the antinoise signal.

3. The extended reality headset according to claim 1, wherein the processor is further configured to:

in response to at least the determination that the first audio activity is voice activity of the first participant in the application session, cause wireless transmission of an indication that a participant in the application session is speaking.

4. The extended reality headset according to claim 1, wherein the processor is further configured to:

determine that second audio activity in the at least one microphone signal is voice activity of an additional participant in the application session; and based at least on the determination that the second audio activity is voice activity of the additional participant in the application session, refrain from generating an antinoise signal to cancel the second audio activity.

5. The extended reality headset according to claim 1, wherein the processor is further configured to:

detect a mode change condition associated with the application session;

in response to the detected mode change condition, cause wireless transmission of an indication of a mode change; and refrain from generating an antinoise signal to cancel the first audio activity based on the detected mode change condition.

6. The extended reality headset according to claim 5, wherein detecting the mode change condition is based on a result of at least one of a facial recognition operation or a gaze detection operation.

7. The extended reality headset according to claim 5, wherein detecting the mode change condition is based on a result of at least one of a keyword detection or a detection of a change of at least one of position or orientation of the extended reality headset.

8. The extended reality headset according to claim 1, wherein the processor is further configured to:

receive a wireless indication of a mode change associated with the application session;

determine that second audio activity in the at least one microphone signal is voice activity of an additional participant in the application session;

in response to the wireless indication of a mode change, generate an antinoise signal to cancel the second audio activity; and cause the loudspeaker to produce an acoustic signal that is based on the antinoise signal.

9. The extended reality headset according to claim 1, wherein the application session is a session of a gaming application.

10. The extended reality headset according to claim 1, wherein the application session is a session of an application for sharing a virtual space.

11. The extended reality headset according to claim 1, wherein the processor is further configured to:

determine that second audio activity in the at least one microphone signal is voice activity of a non-participant in the application session; and based at least on the determination that the second audio activity is voice activity of the non-participant in the application session, refrain from generating an antinoise signal to cancel the second audio activity.

12. The extended reality headset according to claim 1, wherein the processor is further configured to:

generate the antinoise signal or an additional antinoise signal to cancel audio activity of at least one non-participant of the application session; and cause the loudspeaker to produce an acoustic signal that is based on the antinoise signal or the additional antinoise signal.

13. The extended reality headset of claim 1, wherein the device includes an additional extended reality headset.

14. The extended reality headset of claim 1, wherein the first participant in the application session is registered with an application implementing the application session.

15. A method of audio signal processing at an extended reality headset, the method comprising:

determining that first audio activity in at least one microphone signal is voice activity of a first participant in an application session active between at least the first participant and a second participant, wherein the first participant is a user of the extended reality headset and the second participant is a user of a device;

determining a context of the first participant with respect to the application session, wherein the context indicates that at least one of a voice of the first participant in the application session is currently disabled, the first participant in the application session is in a private mode with at least one other participant of the application session, or the voice of the first participant in the application session is blocked by a virtual barrier;

based at least on the determined context of the first participant with respect to the application session and the determination that the first audio activity is voice activity of the first participant in the application session active on the device, generating an antinoise signal to cancel the first audio activity including the voice activity of the first participant in the application session active on the device; and causing a loudspeaker to produce an acoustic signal that is based on the antinoise signal.

16. The method according to claim 15, wherein the method further comprises:

determining that second audio activity in the at least one microphone signal is voice activity of a non-participant in the application session;

based at least on determining that the second audio activity is voice activity of the non-participant in the application session, generating an antinoise signal to cancel the second audio activity; and causing the loudspeaker to produce an acoustic signal that is based on the antinoise signal.

17. The method according to claim 15, wherein the method further comprises:

in response to at least determining that the first audio activity is voice activity of the first participant in the application session, wirelessly transmitting an indication that a participant in the application session is speaking.

18. The method according to claim 15, wherein the method further comprises:

wirelessly receiving an indication that a participant in the application session is speaking; and refraining from generating an antinoise signal to cancel the first audio activity based on the indication.

19. The method according to claim 15, wherein the method further comprises:

detecting a mode change condition;

in response to detecting the mode change condition, wirelessly transmitting an indication of a mode change; and refraining from generating an antinoise signal to cancel the first audio activity based on the detected mode change condition.

20. The method according to claim 19, wherein detecting the mode change condition is based on a result of at least one of a facial recognition operation and a gaze detection operation.

21. The method according to claim 19, wherein detecting the mode change condition is based on a result of at least one of a keyword detection and a detection of a change of at least one of position or orientation of the extended reality headset.

22. The method according to claim 15, wherein the method further comprises:

wirelessly receiving an indication of a mode change;

determining that second audio activity in the at least one microphone signal is voice activity of an additional participant in the application session;

in response to the indication of a mode change, generating an antinoise signal to cancel the second audio activity; and causing the loudspeaker to produce an acoustic signal that is based on the antinoise signal.

23. The method according to claim 15, wherein the application session is a session of a gaming application.

24. The method according to claim 15, wherein the application session is a session of an application for sharing a virtual space.

25. The method according to claim 15, wherein generating the antinoise signal is further based on a context of the application session.

26. The method according to claim 15, further comprising:

determining that second audio activity in the at least one microphone signal is voice activity of an additional participant in the application session; and based at least on the determination that the second audio activity is voice activity of the additional participant in the application session, refraining from generating an antinoise signal to cancel the second audio activity.

27. The method according to claim 15, further comprising:

determining that second audio activity in the at least one microphone signal is voice activity of a non-participant in the application session; and based at least on the determination that the second audio activity is voice activity of the non-participant in the application session, refraining from generating an antinoise signal to cancel the second audio activity.

28. The method of claim 15, wherein the device includes an additional extended reality headset.

29. The method of claim 15, wherein the first participant in the application session is registered with an application implementing the application session.

* * * * *